(12) United States Patent
Singh et al.

(10) Patent No.: US 11,026,283 B2
(45) Date of Patent: Jun. 1, 2021

(54) DETERMINING WHEN TO ESTABLISH CONNECTION BETWEEN MOBILE CLIENT AND PROXY DEVICES

(71) Applicant: Apple Inc., Cupertino, CA (US)

(72) Inventors: Ajoy K. Singh, Milpitas, CA (US);
Dennis Mathews, Pleasanton, CA (US);
Paul V. Flynn, Palo Alto, CA (US);
Wen Zhao, San Jose, CA (US); Yong Liu, Campbell, CA (US); Syed Aon Mujtaba, Cupertino, CA (US); Sriram Hariharan, San Jose, CA (US);
Matthew L. Semersky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/122,131

(22) Filed: Sep. 5, 2018

(65) Prior Publication Data
US 2019/0069329 A1    Feb. 28, 2019

Related U.S. Application Data

(63) Continuation of application No. 14/921,481, filed on Oct. 23, 2015, now Pat. No. 10,085,294.
(Continued)

(51) Int. Cl.
*H04W 4/02* (2018.01)
*H04W 76/10* (2018.01)
(Continued)

(52) U.S. Cl.
CPC .......... *H04W 76/18* (2018.02); *H04B 17/318* (2015.01); *H04W 4/025* (2013.01);
(Continued)

(58) Field of Classification Search
CPC ...... H04B 17/318; H04W 4/02; H04W 4/025; H04W 4/026; H04W 4/027; H04W 4/029;
(Continued)

(56) References Cited

U.S. PATENT DOCUMENTS

| 5,485,634 A | 1/1996 | Weiser et al. |
| 5,954,797 A | 9/1999 | Sidey |

(Continued)

FOREIGN PATENT DOCUMENTS

| CN | 102158532 A | 8/2011 |
| CN | 103429990 A | 12/2013 |

(Continued)

OTHER PUBLICATIONS

International Search Report and Written Opinion, dated Jun. 8, 2016, for PCT Patent Application No. PCT/US2016/012878. 16 pages.

(Continued)

*Primary Examiner* — Alpus Hsu
(74) *Attorney, Agent, or Firm* — Kilpatrick, Townsend & Stockton

(57) ABSTRACT

A client device can be configured to identify data to be communicated with a network. In some examples, the client device can determine one or more transient properties of the client device and/or receive a connection request from a host device that is connected to the network, where the connection request comprises one or more connection properties of the host device. In some instances, the client device can also be configured to determine whether the host device is capable of transmitting the data to the network based at least in part on the one or more transient properties of the client device and the one or more connection properties of the host device and/or establish a connection with the host device in (Continued)

accordance with determining that the host device is capable of transmitting the data to the network.

20 Claims, 11 Drawing Sheets

Related U.S. Application Data

(60) Provisional application No. 62/129,476, filed on Mar. 6, 2015.

(51) Int. Cl.
*H04W 76/18* (2018.01)
*H04W 4/029* (2018.01)
*H04W 4/18* (2009.01)
*H04B 17/318* (2015.01)
*H04W 52/28* (2009.01)
*H04W 4/80* (2018.01)
*H04W 88/04* (2009.01)
*H04W 64/00* (2009.01)

(52) U.S. Cl.
CPC ........... *H04W 4/026* (2013.01); *H04W 4/027* (2013.01); *H04W 4/029* (2018.02); *H04W 4/18* (2013.01); *H04W 4/80* (2018.02); *H04W 52/282* (2013.01); *H04W 64/006* (2013.01); *H04W 88/04* (2013.01)

(58) Field of Classification Search
CPC ..... H04W 4/18; H04W 4/80; H04W 28/0226; H04W 52/282; H04W 64/006; H04W 76/02; H04W 76/028; H04W 76/18; H04W 88/04; H04W 88/182
See application file for complete search history.

(56) References Cited

U.S. PATENT DOCUMENTS

| | | | |
|---|---|---|---|
| 6,317,425 B1 | 11/2001 | Kim | |
| 6,842,434 B1 | 1/2005 | Cook | |
| 7,024,196 B1 | 4/2006 | Kotzin | |
| 7,130,664 B1 | 10/2006 | Williams | |
| 7,443,817 B2 | 10/2008 | Farnham | |
| 7,730,185 B2 | 6/2010 | Chacko et al. | |
| 7,912,002 B2 | 3/2011 | Gaur | |
| 8,351,390 B2 | 1/2013 | Gaur | |
| 8,571,557 B2 * | 10/2013 | Furukawa | H04B 7/15535 455/436 |
| 8,682,243 B2 | 3/2014 | Bienas et al. | |
| 8,787,006 B2 | 7/2014 | Golko et al. | |
| 8,825,040 B2 | 9/2014 | Hooli et al. | |
| 8,971,893 B2 | 3/2015 | Li et al. | |
| 9,240,977 B2 * | 1/2016 | Shekhar Rao Tumula | H04L 63/04 |
| 9,363,010 B2 * | 6/2016 | Lee | H04B 7/26 |
| 9,432,931 B2 | 8/2016 | Roebke et al. | |
| 9,441,976 B2 * | 9/2016 | Venkatraman | H04W 4/80 |
| 9,526,032 B2 | 12/2016 | Ely et al. | |
| 9,661,058 B2 | 5/2017 | Kim et al. | |
| 9,888,478 B2 * | 2/2018 | Kim | H04W 56/0045 |
| 9,950,236 B1 * | 4/2018 | Jooste | G16H 20/30 |
| 9,973,972 B2 | 5/2018 | Ely et al. | |
| 10,085,294 B2 | 9/2018 | Flynn et al. | |
| 2002/0115478 A1 | 8/2002 | Fujisawa et al. | |
| 2002/0168959 A1 | 11/2002 | Noguchi et al. | |
| 2006/0020694 A1 | 1/2006 | Nag et al. | |
| 2006/0123484 A1 | 6/2006 | Babic et al. | |
| 2008/0141146 A1 | 6/2008 | Jones et al. | |
| 2008/0192666 A1 | 8/2008 | Koskan et al. | |
| 2008/0263363 A1 | 10/2008 | Jueneman et al. | |
| 2008/0304364 A1 | 12/2008 | Holtzman et al. | |
| 2009/0046591 A1 | 2/2009 | Krishnaswamy et al. | |
| 2009/0047966 A1 | 2/2009 | Krishnaswamy et al. | |
| 2009/0180449 A1 | 7/2009 | Maki | |
| 2010/0246506 A1 | 9/2010 | Krishnaswamy | |
| 2011/0010258 A1 | 1/2011 | Chavez et al. | |
| 2011/0046878 A1 | 2/2011 | Sung et al. | |
| 2011/0294502 A1 | 12/2011 | Oerton | |
| 2012/0072971 A1 | 3/2012 | Zhang et al. | |
| 2012/0084187 A1 | 4/2012 | Sperling et al. | |
| 2012/0210001 A1 | 8/2012 | Ryerson et al. | |
| 2012/0244847 A1 | 9/2012 | Chandra et al. | |
| 2012/0254448 A1 | 10/2012 | Wheeler et al. | |
| 2012/0311165 A1 | 12/2012 | Renschler et al. | |
| 2013/0041728 A1 | 2/2013 | Morrow et al. | |
| 2013/0250810 A1 | 9/2013 | Ho et al. | |
| 2013/0322281 A1 | 12/2013 | Ludlow et al. | |
| 2013/0344842 A1 | 12/2013 | McDonald et al. | |
| 2014/0045547 A1 | 2/2014 | Singamsetty et al. | |
| 2014/0233458 A1 | 8/2014 | Georgescu et al. | |
| 2014/0250204 A1 | 9/2014 | Shalunov et al. | |
| 2014/0258415 A1 | 9/2014 | L'Heureux et al. | |
| 2014/0274050 A1 | 9/2014 | Wang et al. | |
| 2014/0344446 A1 | 11/2014 | Rjeili et al. | |
| 2015/0350363 A1 | 12/2015 | Li et al. | |
| 2015/0365119 A1 | 12/2015 | Shin et al. | |
| 2015/0365979 A1 * | 12/2015 | Park | H04W 4/029 455/404.2 |
| 2016/0007394 A1 | 1/2016 | Hassan et al. | |
| 2016/0014483 A1 | 1/2016 | Jha et al. | |
| 2016/0038088 A1 * | 2/2016 | Lari | A61B 5/6807 600/595 |
| 2016/0066360 A1 | 3/2016 | Vinegrad et al. | |
| 2016/0095017 A1 | 3/2016 | Ely et al. | |
| 2016/0105923 A1 | 4/2016 | Chen et al. | |
| 2016/0174099 A1 * | 6/2016 | Goldfain | H04W 28/0226 375/130 |
| 2016/0262191 A1 | 9/2016 | Flynn et al. | |
| 2017/0048754 A1 | 2/2017 | Ely et al. | |

FOREIGN PATENT DOCUMENTS

| | | |
|---|---|---|
| CN | 103857013 A | 6/2014 |
| CN | 106664522 A | 5/2017 |
| CN | 107409274 A | 11/2017 |
| DE | 112016001073 T5 | 1/2018 |
| EP | 2 031 919 A1 | 4/2009 |
| EP | 2 034 779 A1 | 11/2009 |
| EP | 2 424 308 B1 | 3/2013 |
| EP | 2 688 346 A1 | 1/2014 |
| EP | 3198909 A1 | 8/2017 |
| JP | 2009164780 A2 | 12/2007 |
| JP | 2009164783 A2 | 12/2007 |
| JP | 2010268330 A2 | 5/2009 |
| KR | 20030032119 A | 10/2001 |
| KR | 20030032119 A | 4/2003 |
| TW | 201613408 | 4/2016 |
| WO | 2015/011710 A1 | 1/2015 |
| WO | 2016/048446 A1 | 3/2016 |
| WO | 2016144422 A1 | 9/2016 |

OTHER PUBLICATIONS

Invitation to Pay Additional Fees and Partial Search Report dated Mar. 31, 2016 for International Patent Application No. PCT/US2016/012878. 6 pages.
Non-Final Office Action dated Jul. 13, 2017 in U.S. Appl. No. 14/921,481. 8 pages.
Notice of Allowance dated May 16, 2018 in U.S. Appl. No. 14/921,481. 5 pages.
Non-Final Office Action dated May 18, 2016 in U.S. Appl. No. 14/632,735. 30 pages.
Final Office Action dated Oct. 27, 2016 in U.S. Appl. No. 14/632,735. 46 pages.
First Action Interview Pilot Program Pre-Interview Communication dated Dec. 16, 2016 in U.S. Appl. No. 15/297,9993 4 pages.
Restriction Requirement dated Mar. 28, 2017 in U.S. Appl. No. 15/297,999. 6 pages.

(56) References Cited

OTHER PUBLICATIONS

Non-Final Office Action dated May 18, 2017 in U.S. Appl. No. 15/297,999.. 11 pages.
Non-Final Office Action dated Sep. 27, 2017 in U.S. Appl. No. 14/632,735. 55 pages.
International Preliminary Report on Patentability dated Sep. 21, 2017 in PCT Application No. PCT/US2016/012878. 11 pages.
Notice of Allowance dated Dec. 18, 2017 in U.S. Appl. No. 15/297,999. 5 pages.
Notice of Allowability dated Apr. 17, 2017 in U.S. Appl. No. 15/297,999. 2 pages.
Final Office Action dated Jul. 26, 2018 in U.S. Appl. No. 14/632,735. 68 pages.
Advisory Action dated Oct. 25, 2018 in U.S. Appl. No. 14/632,735. 7 pages.
Office Action dated Jun. 16, 2016 in Taiwanese Patent Application No. TW104127996. 12 pages. Includes English translation.
Replacement claims filed Dec. 20, 2016 in Taiwanese Patent Application No. 104127996. 8 pages.
Ex Parte Quayle Action mailed Mar. 8, 2018 in U.S. Appl. No. 14/921,481. 6 pages.
International Search Report and Written Opinion dated Oct. 13, 2015 in International PCT Application No. PCT/US2015/042367. 9 pages.
Notice of Preliminary Rejection dated Feb. 13, 2018 in Korean Patent Application No. 10-2017-7005717. 13 pages (includes English translation).
"First Action Interview Pilot Program Pre-Interview Communication," dated Jan. 20, 2016 in U.S. Appl. No. 14/659,930. 4 pages.
"Notice of Allowance," dated Jul. 19, 2016 in U.S. Appl. No. 14/659,930. 8 pages.
Flynn et al., U.S. Appl. No. 14/921,481, filed Oct. 23, 2015.
Notice of Allowance dated Feb. 6, 2017 in Taiwanese Patent Application No. 104127996. 8 pages. (English translation of claims provided).
Jay N. Bruins et al., U.S. Appl. No. 13/768,607, filed Feb. 15, 2013.
International Preliminary Report on Patentability in International PCT Application No. PCT/US2014/014947 dated Aug. 27, 2015. 5 pages.
International Search Report and Written Opinion in International PCT Application No. PCT/US2014/014947 dated May 20, 2014. 7 pages.
Notification Concerning Transmittal of International Preliminary Report on Patentability (Chapter 1 of the Patent Cooperation Treaty) and Written Opinion of the International Searching Authority dated Apr. 6, 2017 in International Application No. PCT/US2015/042367. 7 pages.
"First Office Action," dated Feb. 28, 2020 in Chinese Patent Application No. 201680012968.3. 21 pages (includes English translation).
"Decision to Grant," dated Jun. 30, 2020 in Japanese Patent Application No. ZL201680012968.3. 10 pages (includes English translation of claims only).

\* cited by examiner

DETERMINING WHEN TO ESTABLISH CONNECTION BETWEEN MOBILE CLIENT AND PROXY DEVICES

CROSS-REFERENCE TO RELATED APPLICATIONS

This application is a continuation of and claims benefit to U.S. application Ser. No. 14/921,481 filed Oct. 23, 2015, which claims the benefit to U.S. Provisional Application No. 62/129,476 filed Mar. 6, 2015, which are hereby incorporated by reference in their entirety for all purposes.

This application is also related to the following commonly owned U.S. patent application Ser. No. 15/297,999 filed Oct. 19, 2016, which is a continuation of Ser. No. 14/659,930 filed Mar. 17, 2015 (now U.S. Pat. No. 9,526,032), which claims the benefit of U.S. Provisional Application No. 62/056,297 filed Sep. 26, 2014; U.S. patent application Ser. No. 14/921,490 filed Oct. 23, 2015, which claims the benefit of U.S. Provisional Application No. 62/129,492; and U.S. patent application Ser. No. 14/921,511 filed Oct. 23, 2015, which claims the benefit of U.S. Provisional Application No. 62/129,643 filed Mar. 6, 2015, which are herein incorporated by reference in their entirety for all purposes.

FIELD

Embodiments relate generally to managing proxy network connections between devices.

BACKGROUND

With the ever expanding number of different types of networked devices, users may now simultaneously utilize several computing devices including a desktop computer, a laptop computer, a mobile phone, a tablet, networked wearable devices, networked home appliances, and other networked devices. Smaller mobile devices in particular may not have the power or hardware resources for network connectivity to much of the existing wireless network infrastructure. Additionally, by their very nature, wearable devices are often moving while being worn by users that are active. Managing communications in such an environment is an increasingly complex task.

SUMMARY

Systems, methods, and computer-readable medium for determining when to establish connections between mobile client and proxy devices are provided. In some embodiments, the mobile client devices may have limited wireless network capabilities, such as smart watches or the like, while the proxy devices may have wide area network (e.g., the Internet) access.

According to some embodiments, a client device may be able to achieve Internet access via connecting to a host device with Internet access. The client device may identify the speed and bearing of the client device in response to receipt of a trigger signal indicating that an attempt to connect to the host device is to be performed. The client device may also generate an advertisement message for requesting connection to the host device. The advertisement message may include the speed and bearing of the client device and may be provided to the host device with a request for a wireless connection with the host device. The advertisement message may include the payload to be communicated. The advertisement message may also include an indication of a priority level of the advertisement message. The client device may receive a connection request from the host device that includes a suitability metric that identifies a quality level of the host device for accessing the network.

According to other embodiments, the client device may receive, from the host device, a connection request that includes the speed and bearing of the host device, and a suitability metric associated with the host device. Based on the speed, bearing, and suitability metric, the client device will determine whether to accept the connection request from the host device. The client device may also consider additional factors, such as importance of data to communicate or an amount of time since the last connection, in determining whether to connect to the host device. The client device may receive the connection request at least in response to an advertisement message provided by the client device to the host device. The advertisement message may include a payload and/or may indicate a level of priority of the advertisement message. The client device may provide a single advertisement message and may receive, in response, different connection requests from different host devices.

According to yet other embodiments, the host device may receive, from the client device, an advertisement message that includes a request to communicate data with the wide area network. The host device may then determine a suitability metric based on an ability of the host device to communicate the data between the client device and the wide area network. The suitability metric may measure the communication ability of the host device at the time of receipt of the advertisement message. The suitability metric may be determined based on transient properties of the client device and/or connection properties of the host device. The host device may compare the suitability metric to a threshold in order to determine whether to offer a connection request to the client device. The connection request may be provided to the client device when the suitability metric exceeds the threshold or not provided when the suitability metric does not exceed the threshold. The suitability metric may also be determined by weighting the transient properties, the connection properties, and/or other factors associated with the potential connection between the client device and the wide area network. The connection request may also include the speed and direction of the host device and/or the suitability metric. If the client device accepts the connection request, the host device may establish a connection with the client device, enabling the client device to access the wide area network.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
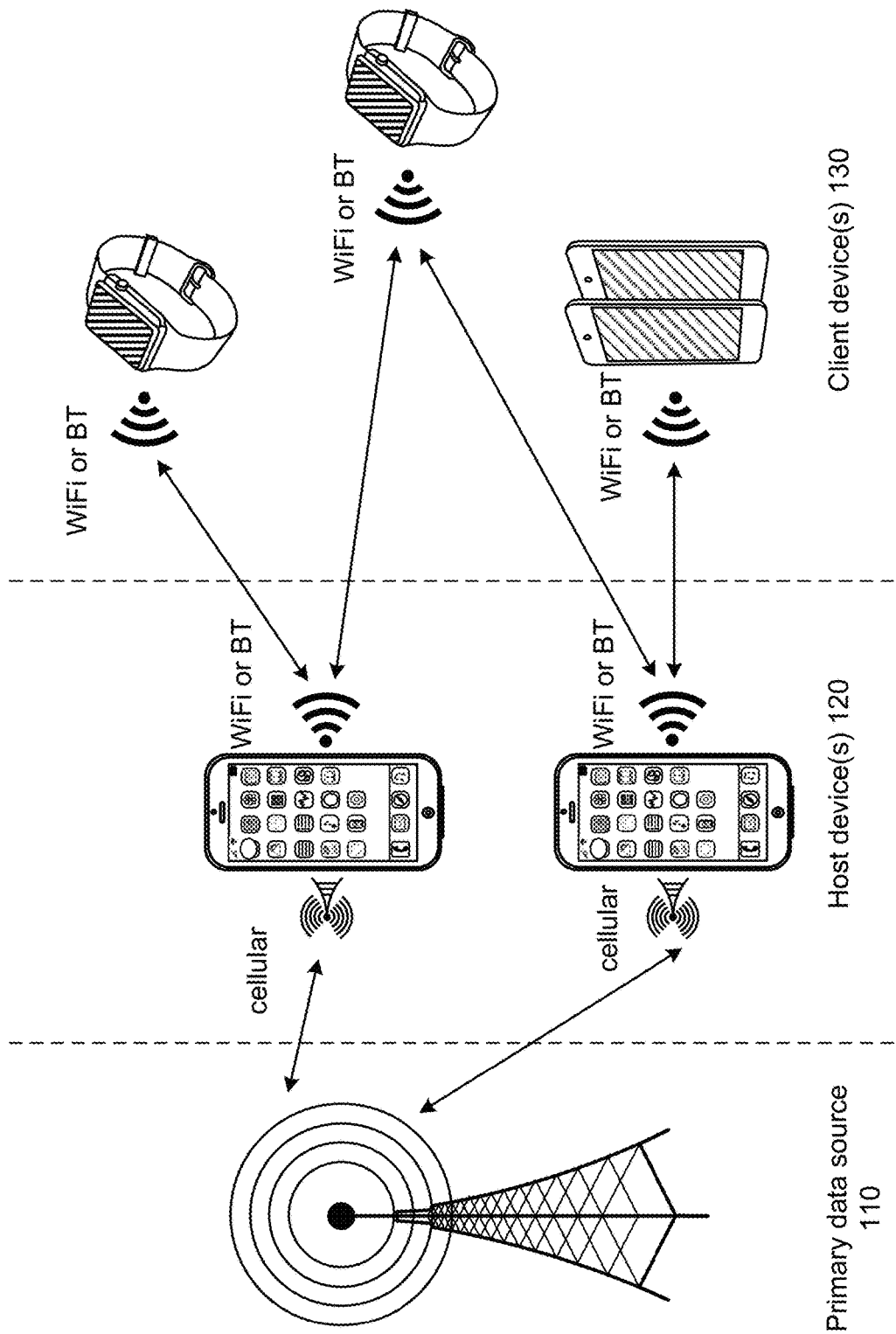
FIG. 1 is an example block diagram of a system showing communication between a primary data source, host device, and client devices.

Embodiments described herein relate to the use of one or more host devices (e.g., smartphones) to provide wide area network (WAN) service (e.g., cellular data service) to electronic devices, such as smart watches and music players, with limited or no configuration WAN connectivity. The electronic devices and/or the host devices may be moving during a connectivity process. The connectivity process can include determinations of whether to proceed with a connection, how to proceed with a connection, and with which devices to create a connection. Such determinations can reduce power consumption, reduce frustration of a user, and provide more reliable connections.

Certain types of electronic devices often do not have cellular data service, or other WAN service, that operates effectively or seamlessly as a user moves from location to location. In many cases, this is due to size and/or power restrictions on such devices. The antennas for such services are larger than the antennas for local area network (LAN) or near field connections provided by WiFi, Bluetooth™ (BT), or other such short-range communication systems. The additional costs and size of WAN network chipsets and WAN service providers also can discourage inclusion of this functionality in some electronic devices. Rather than integrating such functionality with certain types of electronic devices, e.g., small devices, embodiments can use LAN functionality of a connectivity-limited electronic device to enable communication via a host device with WAN access. Some embodiments can enable such communication even while the devices are moving.

Host devices that include WAN functionality and client devices that include LAN functionality may both be configured to identify their own speed and direction of travel (if any). Additionally, a host device may be configured to determine a suitability metric based on an ability of the host device to communicate data between the client device and a WAN. The suitability metric may measure the communication ability of the host device at the time of receipt of an advertisement message from the client device. The suitability metric may be determined based on transient properties (e.g., properties may not last beyond a threshold amount of time, where the threshold is relatively short) of the client device and/or connection properties of the host device, while the advertisement message may be a request for WAN connection that includes the speed and direction of the client device. LAN connections between the client and host devices may be established based on the suitability metric and/or the speed and direction of the potentially connecting devices.

As described herein, a client device and a data consumer each refer to devices that receive the benefit of data shared by a host device and may only have LAN access. Examples of such devices include smart watches, music players such as iPod™ devices, LAN only health monitors, and other such devices with LAN functionality.

A host device, a proxy device, or a data provider all refer to any device with both WAN and LAN functionality that may be configured to provide network access to a client device that may not be associated with a user of the host device. Smartphones are one example of such a host device. Mobile access points (AP) with WAN and LAN functionality, laptop computers, or other such devices may also function as host devices.

I. Devices for Utilizing Proxy

In some examples, a user may utilize at least two electronic devices. One of the two electronic devices may be a client device, while the other may be a host device as defined above. For example, the user may utilize a wearable device and a smartphone, or other WAN-accessible device. While the user's smartphone may regularly act as the host device for the client device to access WAN content, there may be instances where the user is only interacting with the client device and/or is out of range of the host device. In such instances, the client device may attempt to access WAN content via one or more other host devices, e.g., of other users. One such example may include while the user is exercising. In this case, the user may choose to interact with the wearable device due to its smaller size, and may opt to leave the host device behind. As such, if the client device can access WAN content through another host device, it may not have to rely on the user's host device. Other examples may include instances where the battery of the user's host device has degraded or has at least lowered to a level where access to the WAN via the user's host device may not be feasible.

A. Systems

FIG. 1 illustrates a system than can implement proxy network connection management to provide network access to moving client devices without WAN functionality. FIG. 1 includes a primary data source 110, two host devices 120, and three client devices 130. The primary data source 110 may be any data source connected to a WAN such as the Internet. Such primary data sources may include cell phone towers, satellites, high altitude balloons with network functionality, and other such network infrastructure. The primary data source 110 communicates directly with each host device 120 via a WAN connection, such as wireless long-term evolution (LTE) cellular communications.

If a host device 120 is configured to share network resources with client devices 130, then the host device 120 and client device 130 will communicate via a wireless LAN (WLAN) connection, such as WiFi or BT. The WLAN connection may be initiated by either the host device 120 or the client device 130 in different embodiments. In certain embodiments, a client device 130 may select a host device 120 (also called a "proxy device") based on one or more transient factors (including a suitability metric) associated with the host device 120. An appropriate host device may, for example, be selected when the relative movement (e.g., speed and/or direction) between a client device 130 and the available host device 120 is similar and/or when the suitability metric is above a threshold. Such selection or determination of an appropriate host device 120 may be managed by the client device 130 (e.g., based on a user setting and/or logic of an application executed by the client device 130). In some embodiments, the selection may be based on the available bandwidth of the host device 120, or may be determined based on any other such system settings or elements.

B. Proximity of Devices

Figure 2:
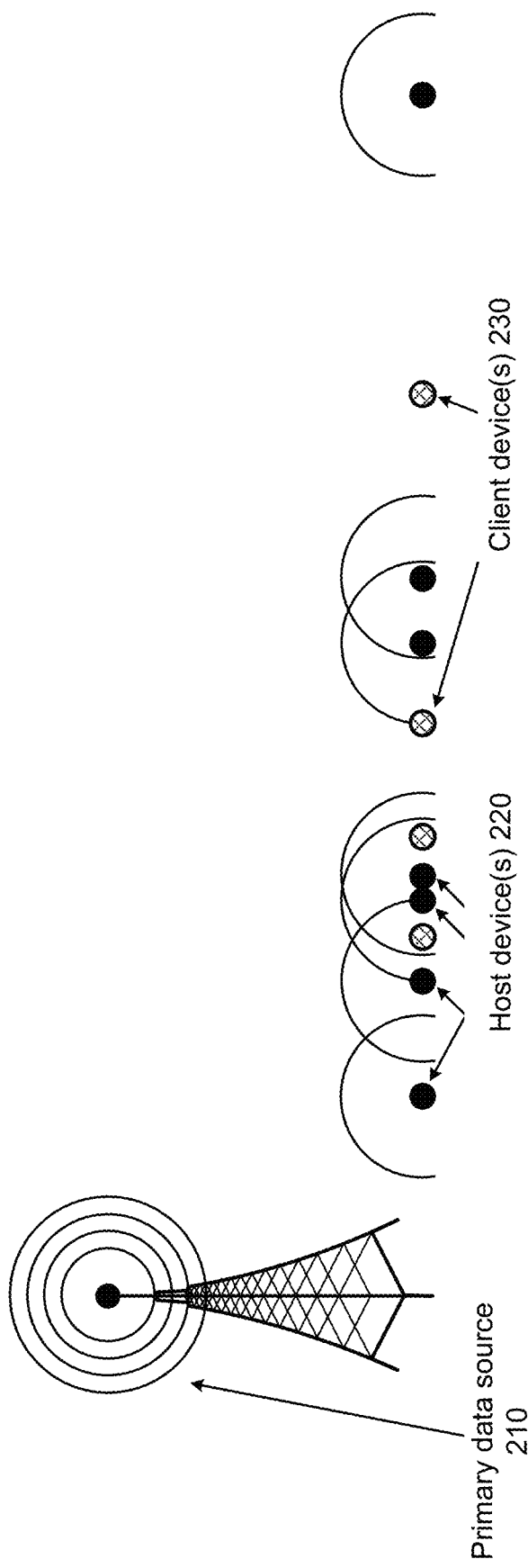
FIG. 2 is an example block diagram illustrating host devices and client devices at various locations.

FIG. 2 is an example block diagram illustrating host devices and client devices at various locations. FIG. 2 similarly shows a primary data source 210, with a number of host devices 220, and client devices 230, where the horizontal axis conveys distance. Each host device 220 is shown with service arcs indicating the effective communication distance for WLAN communications. In many environments, the devices will be on flat ground, so the service is essentially offered in a circle around the host device 220, but inside a building or in other environments, data may also be shared by a host device 220 to client devices 230 above or below a sharing host device 220. As illustrated by FIG. 2, with a sufficient number and density of appropriate host devices 220, regular periodic service, near-continuous, or even continuous service may be offered to client devices 230, even when the client devices 230 are moving in and out of range of connected host devices 220. In some cases, the client devices 230 and the host devices 220 may be moving towards each other or away from each other. In some implementations, such devices may not be a good choice for establishing LAN connections, particularly where a more suitable host is available.

II. Communications Between Devices

The network connection management described above can be done without having to explicitly set up another device on the host device. Normally, one would need to allow tethering explicitly on a user interface and specify a particular device to gain network access. In some examples, a user can specify only some general parameters, and not have to allow access on a device-by-device basis. Since acting as a host device may cause battery drain on the proxy device, and may use data from a cellular data plan of a user of the proxy device (which may be different from the user of the client device), each proxy device can decide whether to volunteer to serve as a host. Additionally, once a potential host volunteers, each client device can decide whether to accept the proxy connection. This section describes inter-device communications and metrics that may be used to facilitate the network connection management (i.e., these decisions) according to embodiments described herein.

Figure 3:
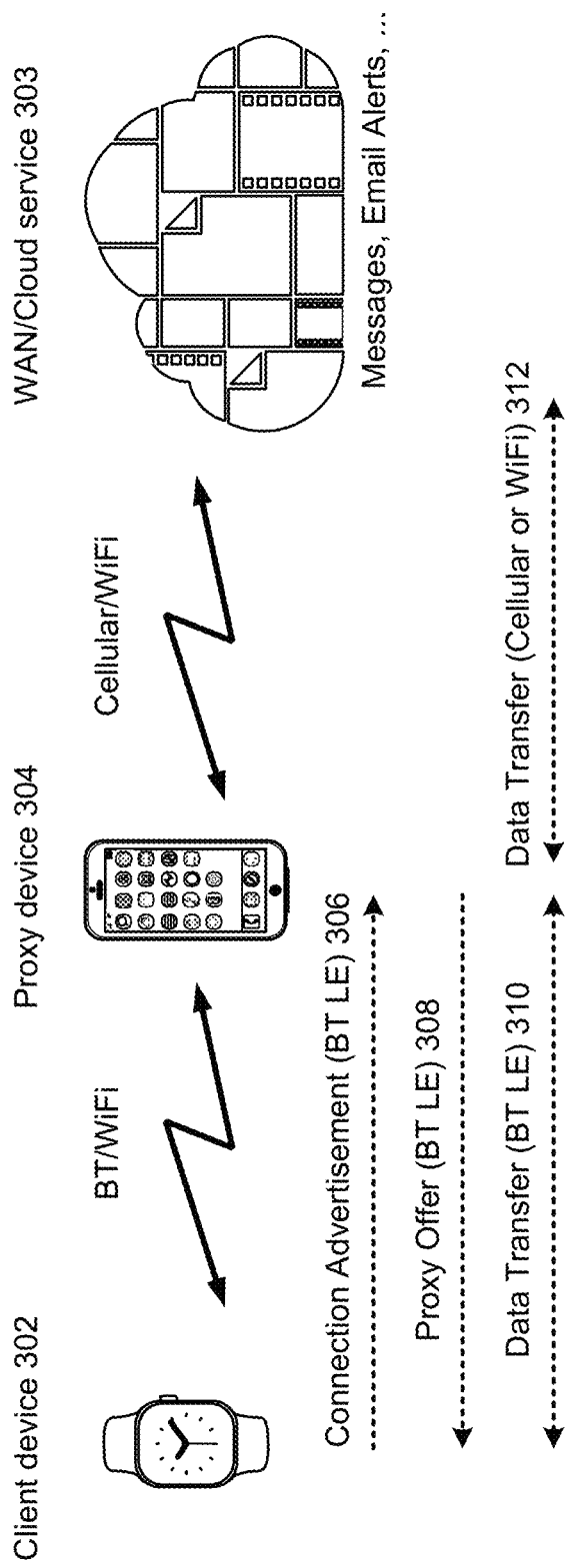
FIG. 3 is an example block diagram showing additional embodiments of the communication between a host device and a client device.

FIG. 3 is a block diagram of a system 300 according to various embodiments. FIG. 3 and other figures are merely illustrative of an embodiment or implementation, or of aspects of an embodiment or implementation disclosed herein, and should not limit the scope of any disclosure as recited in the claims. One of ordinary skill in the art may recognize through this disclosure and the teachings presented herein other variations, modifications, and/or alternatives to those embodiments or implementations illustrated in the figures. FIG. 3 is one example of a system that may use a host device to provide data to client devices. The devices in system 300 can include hardware and/or software elements.

A. Connection Advertisements

FIG. 3 illustrates signaling between a client device 302, a proxy device 304, and a cloud service 303 to which proxy device 304 can connect. Client device 302 may be in motion at the time the client device 302 requests a network connection (e.g., while being worn on a user exercising or otherwise moving). As such, the client device 302 may send out connection requests regularly (e.g., periodically or the like), as any current connection may be only temporary while client device 302 is within range of a host device to which a connection is made. Especially since host devices may also be in motion, connections with host devices may be brief for a client device.

In one aspect, the client device 302 may request such a WAN connection from one or more proxy devices 304 by providing a connection advertisement 306. Generally, connection advertisements 306 can be any type of request for a connection and may not be directed to any particular proxy devices 304. The connection advertisement 306 may include a type of connection being requested, an identifier of the client device 302 (e.g., a device identification (ID) or the like), a payload, a priority level of the request, the speed of the client device 302, and/or the direction (also called "bearing") of the client device 302. The type of the connection being requested may identify whether the client device 302 has data to be uploaded to a server through the WAN or whether the client device 302 is checking for data to be downloaded from a server through the WAN. In some instances, when the client device 302 has data to be uploaded, the payload may include that data.

The connection advertisements 306 may be prompted by a triggering event (e.g., an internal triggering event generated by the client device 302), such as a periodic or contextual signal indicating that the client device 302 can connect to the Internet or other WAN or it may be signaled by an indication that a previous connection with a host device has terminated, e.g., because of separation. For example, the client device 302 may be configured to request a WAN connection periodically (e.g., every minute, every hour, etc.) to check for data to be downloaded or to upload data that was collected (e.g., by sensors) or received (e.g., from the user) by the client device 302. Additionally, the triggering event might occur when the user requests data from the Internet or provides data to be backed-up via the client device 302. As noted, the triggering event might occur when the client device 302 identifies that it is no longer connected to a previously connected proxy device 304.

B. Proxy Offers

As noted, in some embodiments, the proxy devices 304 may determine whether to act as hosts for requesting client devices 302. As such, when a proxy device 304 receives a connection advertisement 306 from a client device 302, the proxy device 304 can make such a determination for the particular requesting client device 302 and/or for that particular point in time. For example, a proxy device may choose to be a host at one point in time for a client device 302, but not choose to be a host for the same client device 302 at a later point in time, e.g., based on different factors. As such, the proxy device 304 may calculate a suitability metric as noted above. Based on that suitability metric, the proxy device 304 may determine whether to offer a proxy connection (e.g., to act as a host) to the client device 302 that provided the connection advertisement. The proxy device 304 may be configured with a threshold value, which may vary based on various factors (or configured by a user). If the suitability metric is above the threshold value, the proxy device 304 may provide a proxy offer 308 to the client device 302. The proxy offer 308 may include the suitability metric.

At least in response to providing a connection advertisement 306, a client device 302 may receive one or more proxy offers 308 from one or more proxy devices 304. As noted, the proxy offer 308 may include the suitability metric calculated by the respective proxy device 304. The client device 302 may then be able to determine whether to accept the proxy offer 308 and connect to the WAN via the proxy device 304, e.g., based on the suitability metric contained in the proxy offer. Proxy offers 308 may be provided to several client devices 302 at the same time, or at least within the same time period. Proxy offers 308 may expire after a particular amount of time and that amount of time, along with a transmission time, may be included in the proxy offer 308.

Data transfer 310 may then take place between the client device 302 and the proxy device 304 via the LAN once the proxy offer 308 is accepted by the client device. For example, data of the client device 302 to be uploaded to the cloud service 303 or other WAN location via the proxy device 304 may first be transferred 310 from the client device 302 to the proxy device 304. The proxy device 304 may then transfer 312 that data over the cellular/WiFi connection to the WAN, e.g., cloud service 303. Further, data to be downloaded by the client device 302 may first be transferred 312 to the proxy device 304 from the WAN, e.g., cloud service 303, and then transferred 310 to the client device using the LAN connection.

III. Using Speed and Direction

The client devices and the proxy devices may be in motion, and the two devices may not be moving at similar speeds or in similar directions. As such, a proxy device 304 acting as a host for a client device 302 may not be a suitable host candidate once the two devices are outside of each other's LAN ranges (e.g., based on the type of LAN components used, the technologies available on the devices, and/or the remaining battery power of the devices). For example, if the user of a client device 302 is on a bus or other public transit, and is connected to a WAN via a proxy device 304 of another user also on the same bus, the two devices may move together. As such, they may share a common speed and/or direction as the two users sit on the moving vehicle. In this situation, as long as the proxy device 304 has a WAN connection (e.g., a cellular data connection or the like) and the two users remain on the vehicle, the proxy device 304 may effectively act as a host for the WAN connection to the client device 302. However, if either user exits the bus, the speed and direction of the devices may change in such a way that the proxy device 304 may no longer be a suitable host (e.g., the two devices may no longer be in range after a few feet or so).

In some embodiments, the connection advertisement 306 sent by a client device requesting a connection may include the speed and bearing of the client device 302. The speed and bearing information may be detected or otherwise identified by local sensors integrated with or otherwise connected to the client device 302 and/or the proxy device 304. For example, the client device 302 may be a smart watch with an accelerometer or other motion detection sensor integrated within the client device 302. The client device 302 may also be configured with an onboard motion processor or co-processor that can detect the speed and bearing of the client device 302. The speed may be measured in any appropriate metric (e.g., feet per second, meters per second, etc.). The bearing may indicate that the client device 302 (or a user wearing the client device 302) is moving in one of many relative degrees of a standard compass (e.g., North, East, etc.). Other referential coordinates may be used to indicate the direction (bearing). Further, knowing the speed and direction of the client device 302 may enable calculation of the velocity of the client device 302.

In some embodiments, the client device 302 may check its own speed against a threshold before sending the connection advertisement 306, and may choose not to send the advertisement 306 if the speed of the client device 302 is greater than the threshold (e.g., the client device 302 is moving too fast to bother trying to connect to a proxy device 304). However, in the bus example provided above, this may result in not connecting to a proxy device 304 that would have otherwise been suitable. Further, the priority level of the request may indicate how important it is for the client device 302 to connect to the Internet (e.g., how long it has been waiting for a connection, etc.). In some cases, the speed and bearing information provided in the connection advertisement 306 may enable the receiving proxy devices 304 to decide whether to offer to be a host for the client device 302 that provided the connection advertisement 306. For example, a proxy device 304 may be able to determine, based on its own speed and bearing, based on a suitability metric, and/or based on other factors, whether the proxy device 304 would make a good host of a WAN connection for the client device 302 to access.

A. Client Device

Figure 4:
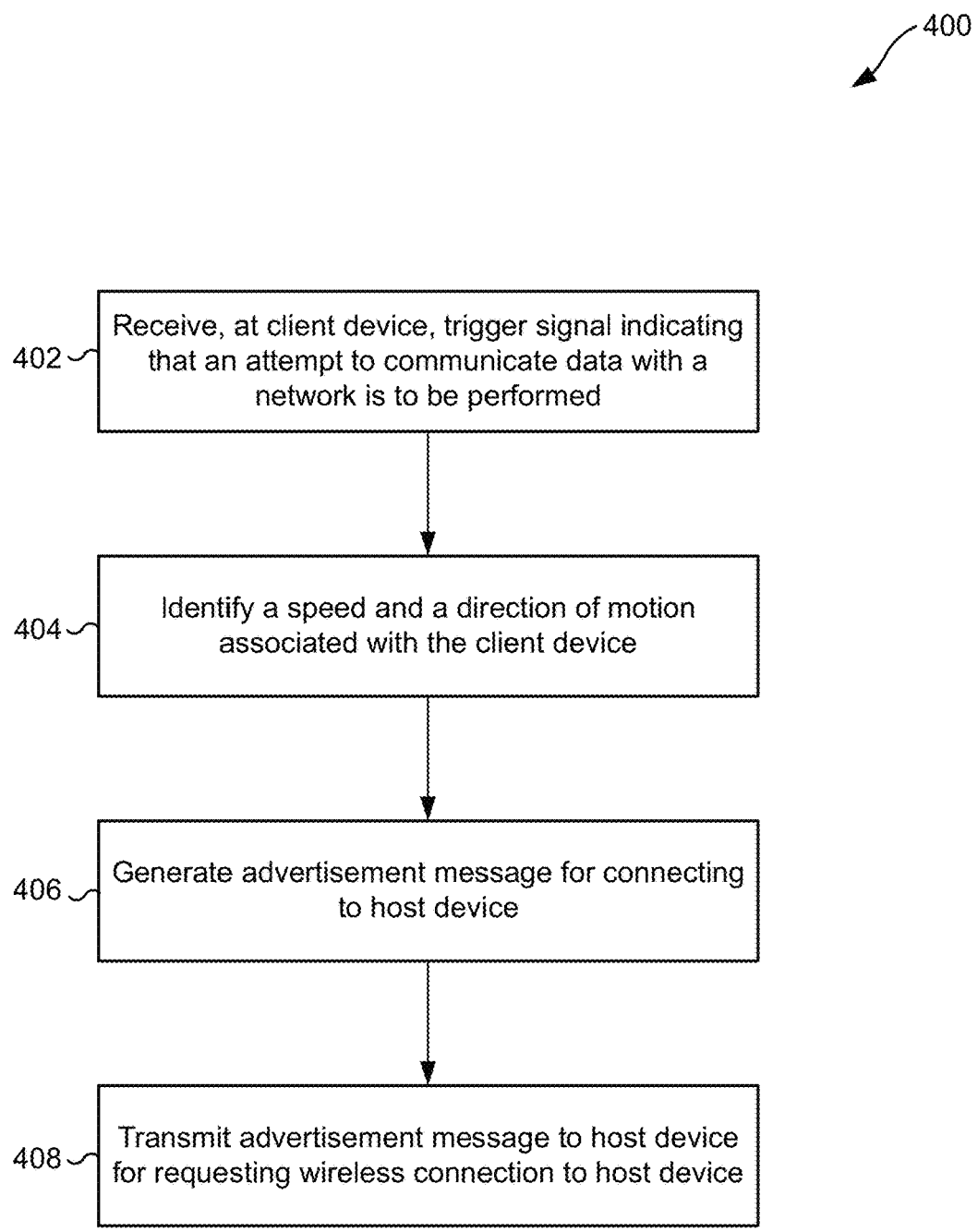
FIG. 4 is a flowchart of an example method of using a client device to provide speed and direction information within an advertisement message requesting a connection to a network.

FIG. 4 is a flowchart of an example method of using a client device to provide speed and direction information within an advertisement message requesting a connection to a network. The method 400 of FIG. 4 may be implemented, e.g., by the client device 302 of FIG. 3 by executing computer-executable instructions or the like stored thereon. The client device 302 may be configured with a wireless interface, a memory, a motion detection sensor, and a processor coupled to the memory, to the motion sensor, and/or to the wireless interface.

At 402, a client device may receive a trigger signal indicating that an attempt to communicate data with a network is being performed. In other words, the client device may determine the need to communicate data with a network (e.g., a WAN such as the Internet or the like). As various examples, the trigger signal may be based on a periodic check for content from the WAN, a periodic check to upload data through the WAN, a selection of data (e.g., by the user) to be uploaded or downloaded, the occurrence of an event (e.g., data capture) at the client, or the like. For example, the user may be attempting to send a message from the client device or may be attempting to download information from the Internet.

At 404, the client device may identify a speed and direction of motion associated with the client device. The speed and direction of motion may be identified in response to receipt or identification of the trigger signal, or it may be identified routinely (e.g., periodically) during motion. For example, as noted, the client device may be equipped with one or more motion sensing devices and/or location tracking devices (e.g., a global positioning system (GPS) device or the like) and may be able to identify its own speed and direction of movement. The sensor data may be retrieved or otherwise identified whenever the client device is in motion, e.g., in anticipation of desiring the sensor data. Additionally or alternatively, the sensor data may also be retrieved in response to the trigger.

At 406, once the speed and direction are identified, the client device may be configured to generate an advertisement message for connecting to a host, such as proxy device 304 of FIG. 3. The advertisement message may include the speed and direction of the client device. The advertisement message may also include a request for the data to be communicated with the network (e.g., the WAN).

At 408, the client device may transmit the advertisement message (e.g., via the wireless interface) to a host device for requesting a wireless connection to the host device 304. The advertisement message may include a data payload to be uploaded to the WAN. In various examples, the advertisement message may include a request for data to be downloaded to the client device and may, in some instances, also include a location at which the data may be located (e.g., a resource locator, an address, or the like) and/or an identifier of the data.

In some embodiments, the client device may be associated with a first user and the host device may be associated with a second user. In some cases, the first user and the second user may be different users. Further, in some examples, the client device may determine whether the first user is different from the second user (e.g., in response to the trigger signal), and may cancel the request for the wireless connection to the host device when the user is not different from the second user. In other words, if the potential host device is the user's own device (i.e., the same user associated with the client device), the client device may not need to perform any of the steps or may not need to perform all of the operations associated with the steps at 402, 406, 404, or 408, since the two devices may be configured to automatically communicate with one another (e.g., for providing Internet access to the client device).

B. Proxy Device

Proxy devices, such as the proxy device 304 of FIG. 3, may be configured to host WAN access (e.g., the Internet) for a client device 302. For example, a client device 302 may provide a connection advertisement, requesting such WAN access from the proxy device 304. However, the proxy device 304 may decline to act as a host, depending on several factors. Additionally, in some embodiments, the proxy device 304 may not be a suitable host for the client device 302 for one or more reasons. As such, upon receipt of a connection advertisement from a client device 302, the proxy device 304 may determine whether to offer itself as a host to the requesting client device 302.

As noted, the advertisement from the client device 302 may include the speed and bearing of the client device 302. Similarly, the advertisement may also include a received signal strength indication (RSSI) and/or signal-to-noise ratio (SNR) information, effectively indicating (or using a congestion control algorithm (CCA) to detect) the strength of the potential communication between the client device 302 and the proxy device 304. In other words, in this context, the RSSI and the SNR may be an indication of how well the proxy device 304 will be able to host. For example, if the RSSI is low, the ability of the proxy device 304 to host the WAN connection for the client device 302 will be limited even if the WAN connection of the proxy device 304 is excellent. In some examples, Reference Signal Receive Power (RSRP) information may replace or be provided in addition to RSSI.

Upon receipt of the advertisement from the client device 302, the proxy device 304 may determine whether to provide a proxy offer in return. As noted, this determination may be based on several factors including, but not limited to, the speed and bearing of the client device 302 (e.g., with reference to the speed and bearing of the proxy device 304), the RSSI, the quality and/or strength of the WAN connection of the proxy device 304, as well as the battery and/or data usage budgets of the proxy device 304 or an account associated with a user of the proxy device 304. In some embodiments, certain factors may be weighted more than others and one or more factors may serve as sole determinants, essentially ending any further analysis. In some embodiments, each factor must separately be satisfied to provide a proxy offer; however, in other embodiments, one or more factors need not be satisfied. For example, the cellular connection (or WAN connection) of the proxy device 304 may act as a breakersole determinant in that if this connection is below a threshold level, the proxy device 304 may decide not to provide a proxy offer without considering any other factors. In this way, a breakersole determining factor may trump or otherwise outweigh all other factors of consideration. However, in other examples, each factor may be weighted evenly and considered together in making the determination of whether to provide a proxy offer.

In some embodiments, each factor may have its own threshold level that can be reached before the proxy device 304 provides a proxy offer. For example, there may be a separate threshold for RSSI that is to be reached, plus a separate threshold for cellular connection that is to be reached. When both threshold levels are not reached (e.g., the RSSI is above the threshold but the cellular connection is not), the proxy device 304 may decide not to send the proxy offer. However, as noted above, some factors may be weighted more heavily. In this way, even if one factor is below its threshold, another factor that is weighted higher may be above its threshold and the proxy device 304 may decide to provide the proxy offer.

Additionally, in some examples, the factors may be combined to form a suitability metric that may be provided to the client devices 302 (e.g., as part of the proxy offer when one is provided). A single threshold may be used to determine whether to send a proxy offer (e.g., the factors may be combined to a single value (like the suitability metric) and may be compared against a single threshold). Thresholds for the noted factors may be based on industry standards, set by an administrator of the system, and/or configured by a user (e.g., the user of the client device 302 or the user of the proxy device 304) as desired. Further, in some examples, each factor may be categorized (e.g., good, medium, bad or high/low), and the determination of whether to send or accept the proxy offer may be based on some of the factors being of a certain category, all of the factors being of a certain category, or some combination of the like.

C. System Environment

Figure 5:
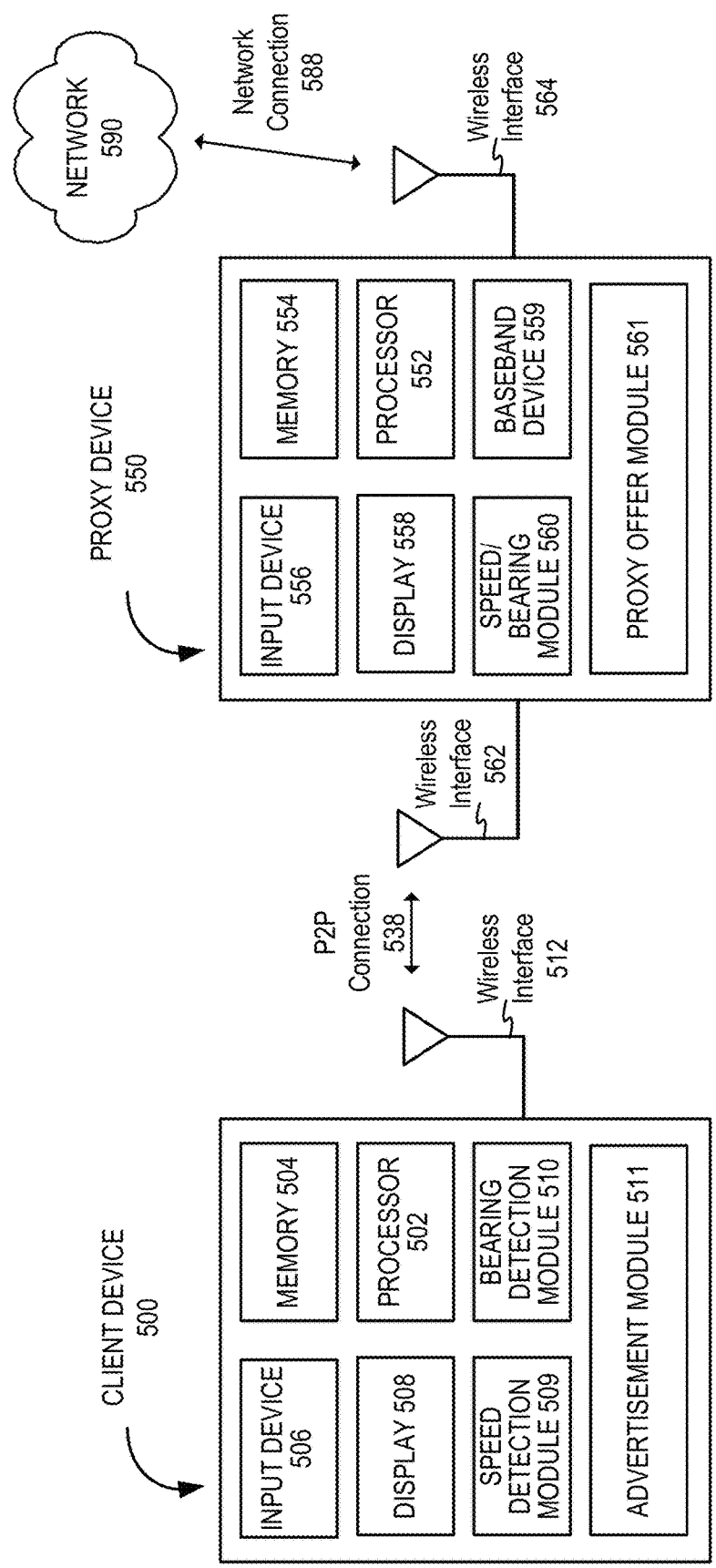
FIG. 5 is an example block diagram showing a client device and a proxy device.

FIG. 5 illustrates a client device and a host device that may be used in conjunction with or as part of systems 100 and 300 of FIGS. 1 and 3 to implement the management of proxy connections. While two embodiments are illustrated by these figures, various implementations may include any number of client devices, host devices, and different networks, which may be supported by the devices in a particular setup.

It should be apparent that the systems shown in FIG. 5 illustrate one embodiment and that other similar embodiments can have more or fewer components than what is shown. Other embodiments may also include different configurations of the illustrated components, while remaining within the scope of the disclosure herein.

FIG. 5 illustrates an embodiment with client device 500, proxy device 550, and network 590. Client device 500 may be any device accessible by a wireless interface, including a desktop computer, a laptop computer, a smartphone, a tablet computer, a wearable device (e.g. a network enabled watch, earpiece, or necklace,) a networked appliance (e.g. a network enabled refrigerator or clothes washer,) media player, personal digital assistant, key fob, access card, multi-function device, game system, or any other such client device.

Client device 500 comprises memory 504, processor 502, input device 506, display 508, and wireless interface 512. Client device 500 may also be configured with one more software modules for execution of particular functions, algorithms, and/or methods including, but not limited to, speed detection module 509, bearing detection module 510, and advertisement module 511. Proxy device 550 includes processor 552, memory 554, input device 556, display 558, wireless interface 562, wireless interface 564, and baseband device 559. Proxy device 550 may also include speed/bearing module 560 and/or proxy offer module 561.

Proxy (host) device 550 may be any communication device capable of providing a proxy connection to a client device 500 in a fashion similar to what is described above for the management of proxy connections from various host devices to various client devices. Certain embodiments of host devices may have multiple communications interfaces, such that as part of data sharing performed by a host device, the host device communicates with a network using one communication interface based on a first communication protocol, and a the host device communicates with a client device using a second communication interface different from the first communication interface and based on a second communication protocol different from the first communication protocol. Examples of such host devices may include smart phones, desktop computers, laptop computers, and other such network enabled computing devices.

Client device 500 may communicate with host device 550 via connection 538. Similarly, host device 550 may communicate with network 590 via connection 588. In further embodiments, client device 500 may also create a connection with one or more other networks including network 590. Connection 538 in particular may, in certain embodiments, be implemented as a peer to peer (P2P) wireless connection directly between wireless interface 512 and wireless interface 562. In other embodiments, connection 538 may include multiple additional devices and sub-connections, including multiple access points, network routing connections, and communication servers.

Processors 502 and 552 may run various software components stored in respective memories 504 and 554 to perform various functions for devices 500 and 550 such as, but not limited to, modules 509, 510, 511, 560, and 561. In some embodiments, the software components also include an operating system. In some cases, the speed detection module 509 may be configured to detect the speed of the client device 500. Similarly, the bearing detection module 510 may be configured to detect direction (bearing) of the client device 500. Additionally, in some examples, the advertisement module 511 may be configured to determine when to provide a connection advertisement as well as what to include in the advertisement.

As noted, the advertisement may include the speed and bearing of the client device 500 as well as other information. The speed/bearing module 560 of the proxy device 550 may act similar to the respective speed and bearing modules 509 and 510 of the client device 500. In some cases, the client device may comprise a combined speed/bearing module or the two separate modules shown. Similarly, the proxy device 550 may include separate speed and bearing detection modules instead of the single speed/bearing module 560 shown. In either case, the proxy device and the client device 500 may be able to detect or otherwise identify their own respective speed and bearing. Further, the proxy device 550 may include a proxy offer module 561. The proxy module 561 may be configured to determine whether to provide a proxy offer to a client device 500 (e.g., based on the factors described above).

In some embodiments, host devices and/or client devices may include various sensors. A camera may be one example of a sensor. Sensors can include accelerometers, compasses, gyrometers, pressure sensors, audio sensors, light sensors, barometers, microphones, and the like. Sensors can be used to implement various device decision-making and filtering, such as blur compensation for a video image in a video call, or audio filtering to assist in filtering background noise from audio information captured at one or more microphones such as microphone.

In some embodiments, a client device 500 or a host device 550 can include a Global Positioning System (GPS) receiver or other location assistance devices or modules. A device can use a satellite navigation system, such as the GPS, to obtain the speed information, the bearing information, position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. Other non-GPS location/motion modules may assist in determining the current position (e.g., coordinates or other geographic location identifier), speed, direction, and/or motion of a client device 500 or host device 550. In addition to GPS, cellular network positioning based on "cell IDs," and WiFi positioning technology based on a WiFi networks may be used for location assistance. In some embodiments, location/motion modules may use sensor information with the above systems to determine the current position of the host device. The location information may then be used to manage data sharing connections not only for a current host device that is sharing data, but for other host devices that may be used for data sharing based on movement of client devices.

IV. Suitability Metric

Various methods can be performed by a proxy device to provide a WAN connection to a client device. Methods can be performed by the client device to obtain and/or provide data to the WAN via a proxy device.

A. Determination of Suitability Metric

Referring back to FIG. 5, one or more proxy devices 550 may receive a connection advertisement provided by the client device 500 (e.g., via the connection 538). Each proxy device 550 may then make a determination, using the proxy offer module 561, regarding whether to offer a proxy connection to the requesting client device 500. For example, the proxy device 550 may identify its own speed and bearing and compare that with the speed and bearing of the client device 500 that was included in the connection advertisement. However, in some embodiments, the proxy device 550 may calculate or otherwise determine a suitability metric that can be utilized to aid in making the determination of whether to send a proxy offer.

A suitability metric may be any metric or combination of metrics desired for identifying how well a proxy device 550 will act as a proxy for Internet connectivity to be offered to a client device 500. The suitability metric may measure the ability of the proxy device 550 with respect to factors that more directly affect the proxy device 550 (e.g., external network congestion, number of other devices connected to the proxy device 550, data plan budget of the proxy device 550, battery levels of the proxy device 550, etc.) and/or factors that more directly affect the client device 500 (e.g., relative speed and bearing of the devices, LAN signal strength). The suitability metric may be based on other factors as well, and it may be a percentage (e.g., 10%, 50%, etc.) or it may be a value out of another value (e.g., $50/100$, or $1/5$). More specifically, the suitability metric may be a value calculated by combining values associated with several factors including, but not limited to, speed and bearing of the proxy device 550, speed and bearing of the client device 500, a received signal strength indication of the connection advertisement, WAN network congestion and/or connection quality (e.g., whether the cellular connection is 2G, 3G, LTE, or the like), data usage budgets of the proxy device 550, and/or battery budgets of the proxy device 550. Each value may be weighted, in some examples, such that relative importance for each factor may be considered. For example, if the speed and bearing of the two devices is the most important factor in determining a suitability metric, the speed and bearing may be weighted the greatest.

The suitability metric may be calculated by the proxy device 550 after the proxy device 550 receives the connection advertisement from the client device 500. For example, the suitability metric may be calculated for a specific timeframe associated with receipt of the connection advertisement. In this way, the suitability metric may be an appropriate measure of proxy connection suitability for that specific timeframe. If too much time passes after the connection advertisement is received, the suitability metric may no longer be valid. This is especially true when the connection advertisement includes the speed and bearing of the client device 500 and when the suitability metric is to be based on that speed and bearing with relation to the speed and bearing of the proxy device 550.

One reason for calculating a suitability metric is to provide a metric to the client device 500 for determining which proxy device 550 to utilize as a proxy (e.g., when multiple proxy devices 550 offer proxy connections). Another reason is to allow the proxy device 550 to decide whether to offer such a proxy connection. In either case, the relative speed and bearing of the devices may be a heavily weighted factor. As such, part of calculating the suitability factor may include comparing the speed and bearing of the client device 500 (e.g., which was provided with the connection advertisement) with the speed and bearing of the proxy device 550. As noted, with respect the client device 500, the speed and bearing of the proxy device 550 may be identified or otherwise determined utilizing integrated (or onboard) accelerometers, motion detection sensors, and/or motion processors. The comparison of the relative speed and bearing information may yield a first metric for calculating the suitability metric.

As noted, other factors may also be utilized in calculating the suitability metric. For example, the proxy device 550 may be configured to identify the RSSI of the connection advertisement. Such a value may indicate the strength of incoming, and potentially future, transmission between the proxy device 550 and the client device 500 through the LAN. Additionally, the quality, strength, and/or congestion of the WAN may be a factor in determining the suitability metric. For example, if the WAN connection of the proxy device 550 is poor, there would be little gained by providing a proxy connection to a client device 500, even if the LAN connection between that client device 500 and the proxy device 550 were very strong. Other factors may include the battery levels and/or budgets of the proxy device 550 as well as data usage budgets of the proxy device 550. More specifically, if the battery of the proxy device 550 is very low, this will affect the suitability metric; because, the proxy device 550 may not be well suited as a proxy if its battery is not going to last much longer. Similarly, if a service provider or cellular carrier that provides WAN data to the proxy device 550 limits the amount of the data that the proxy device 550 can receive, and/or if the user only pays for a certain amount of data, data usage budgets may come into play when determining the suitability of the proxy device 550 as a proxy. For example, if there is very little data available for download by the proxy device 550 (e.g., based on limits, budgets, or the like), the suitability metric may be lowered to indicate that this proxy device 550 may not be as suitable as another proxy device 550 with a higher budget or less of its budget already used. In some embodiments, each factor may be categorized and a score may be determined for each category (e.g., using the weights noted above or simply using raw numbers). The category scores may be added to calculate the suitability metric. As desired, other ways of calculating the suitability metric using any or all of the noted factors may be utilized.

B. Proxy Device with Suitability Metric

A proxy device such as the proxy device 550 of FIG. 5 may utilize a suitability metric in various ways. For example the proxy device 550 may calculate the suitability in order to determine whether to provide a proxy offer or connection request to appropriate client devices (e.g., the client device 500 of FIG. 5 or similar). Additionally, the suitability metric may be included with the proxy offer.

Figure 6:
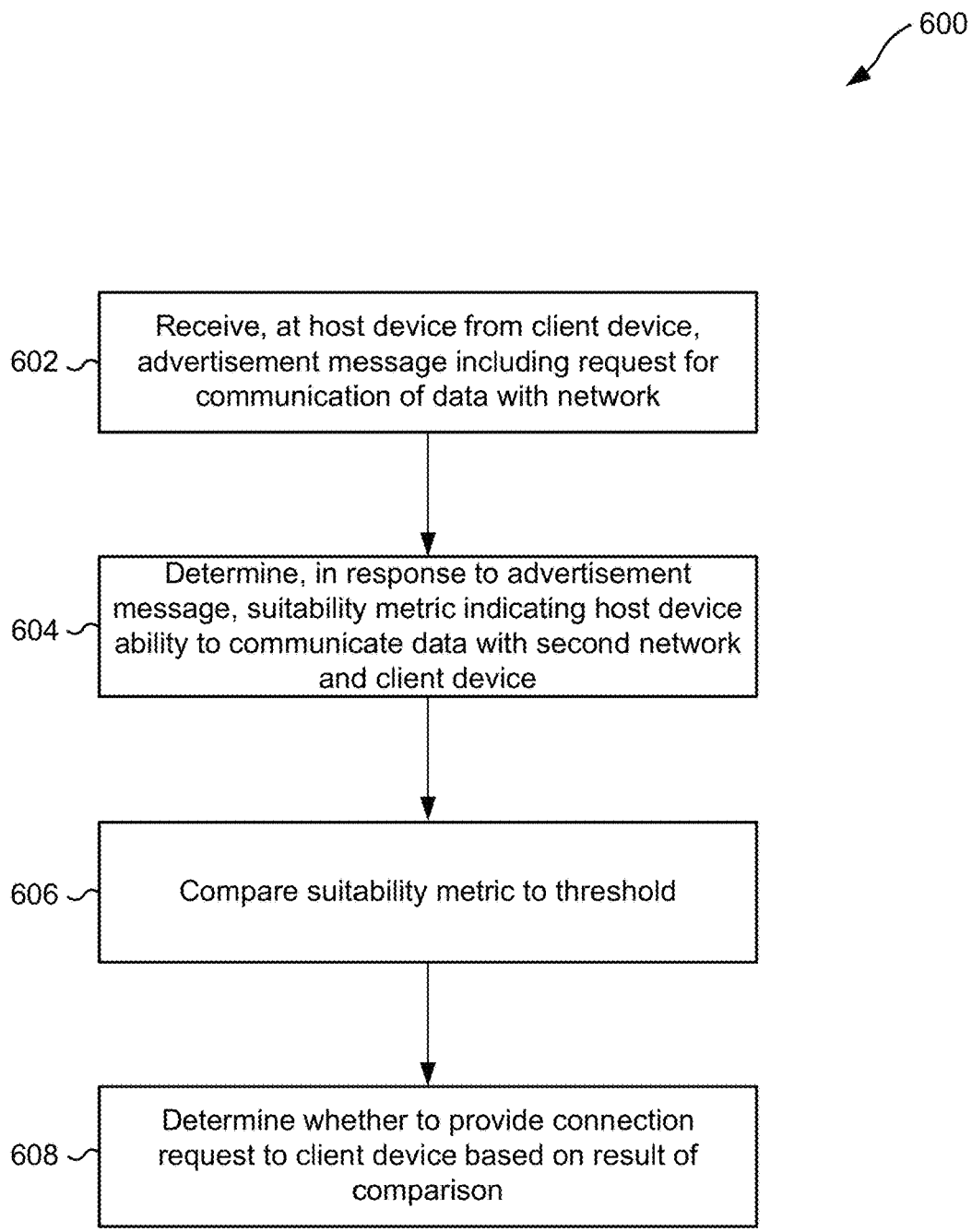
FIG. 6 is a flowchart of an example method of using a suitability metric to determine whether to offer a proxy connection to a client device.

FIG. 6 is a flowchart of an example method of using a suitability metric to determine whether to offer a proxy connection to a client device. The method 600 of FIG. 6 may be implemented by a proxy device (e.g., 550 of FIG. 5) by executing computer-executable instructions or the like stored thereon. The proxy device may be configured with a first wireless interface for communicating with a first network (e.g., a LAN with the client device 500 of FIG. 5), a second wireless interface for communicating with a second network (e.g., WAN, Internet, etc.), a memory, a motion detection sensor, and a processor coupled to the memory, to the motion sensor, and/or to the wireless interfaces.

At 602, the proxy device may receive, via the first wireless interface, an advertisement message from the client device that includes a request for communication of data with the second network. For example, the advertisement message may include a request to upload or download data from the Internet or the like. The advertisement message may also include a payload (e.g., the data to be uploaded) and/or other information about content to be communicated.

At 604, the proxy device may determine a suitability metric that measures an ability for the proxy (host) device to communicate the data with the second network and communicate the data with the client device at the time of receiving the advertisement message. The suitability metric may be determined in response to receipt of the advertisement message. In some embodiments, the suitability metric may be based on transient and/or motion properties of the client device as determined from the advertisement message and/or connection properties of the proxy device with the second network (e.g., Internet and/or cellular network connectivity levels). The suitability metric may be calculated for a specific timeframe associated with receipt of the advertisement message. In this way, the suitability metric may be an appropriate measure of proxy connection suitability for that specific timeframe.

At 606, the proxy device may compare the suitability metric to a threshold. The comparison can determine whether the suitability metric is greater than, equal to, or less than the threshold. Such a comparison can also involve non-numerical values, with some ranking among classifications (e.g., a metric classification compared to a threshold classification). In some embodiments, the threshold is a default that is static or set by a user. In other embodiments, the threshold is dynamic. For example, the threshold can be based on a battery level of the proxy device or an amount of bandwidth available. Such criteria can also be used to determine the suitability metric.

At 608, the proxy device may determine whether to provide a connection request to the client device based on the result of the comparison. In some examples, the proxy device may provide the connection request (e.g., via a wireless interface) to the client device when the suitability metric exceeds the threshold or not provide the connection request to the client device when the suitability metric does not exceed (or is less than) the threshold.

According to one embodiment, transient or other properties of the client device may include a speed of the client device and/or a direction of motion of the client device. The suitability metric may be determined to be higher than an initial amount (e.g., above a threshold) when the speed of the client device and the direction of motion of the client device are similar to the speed and direction of motion of the host device. Connection properties of the host device may include a signal strength with the network (e.g., strength of the Internet connection and/or strength of the potential local connection with the client device) and/or a congestion of the network (e.g., Internet congestion). In some examples, the suitability metric may be determined to be higher than an initial amount (e.g., above a threshold) when the signal strength with the network is above a signal strength threshold and/or the congestion of the network is below a congestion threshold.

C. Client Device with Suitability Metric

As noted, a client device such as the client device 500 of FIG. 5 may also utilize a suitability metric in various ways. For example the client device 500 may receive the suitability metric in a proxy offer and use the suitability metric to determine whether to accept a proxy offer or connection request from a proxy device (e.g., the proxy (also referred to as "host") device 550 of FIG. 5 or similar).

Figure 7:
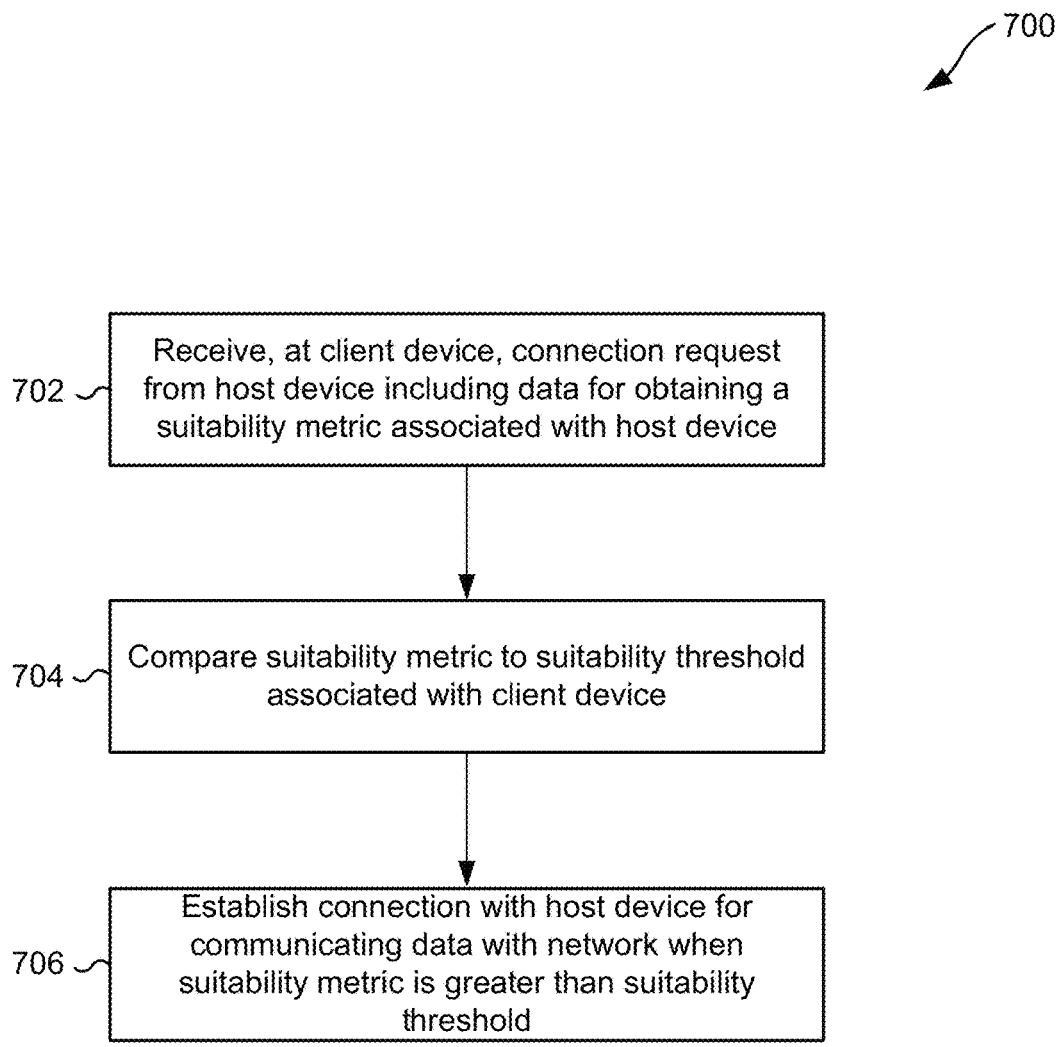
FIG. 7 is a flowchart of an example method of using a suitability metric from a proxy device to determine whether to accept a proxy offer to connect to a network through the proxy device.

FIG. 7 is a flowchart of an example method of using a suitability metric from a proxy device to determine whether to accept a proxy offer to connect to a network through the proxy device. The method 700 of FIG. 7 may be implemented by a client device (e.g., 500 of FIG. 5) by executing computer-executable instructions or the like stored thereon. The client device may be configured with a wireless interface, a memory, a motion detection sensor, and a processor coupled to the memory, to the motion sensor, and/or to the wireless interfaces.

At 702, the client device may receive a connection request (or proxy offer) from the proxy device via the wireless interface. The connection request may include data for obtaining a suitability metric associated with the proxy device. For example, the data may enable the client device to look-up or otherwise request the suitability metric, or the data may enable the client device to calculate the suitability metric. In some cases, the data may be the suitability metric.

At 704, the client device may compare the suitability metric to a suitability threshold associated with the client device. The threshold may be set by an administrator, software developer, hardware manufacturer, or the user of the client device. In this way, different levels of suitability may be allowed for each connection request (or proxy offer). The threshold may be updated dynamically based on external and/or internal conditions, or it may be different for different types of proxy devices (e.g., proxy devices with better hardware/newer technology may be preferred and, thus, the threshold may be lower for new proxy devices or proxy devices with newer software). The suitability threshold may also be based on the amount of time since the last connection of the client device to the WAN or Internet (e.g., the network) and/or an importance of the data.

The suitability threshold may be calculated by taking one or more of several factors into consideration, including the importance of the data to be communicated. For example, the data may be identified as important by the user (e.g., a message to another user on a priority list, a message flagged as urgent, data that is time sensitive, data that has been waiting to be transmitted for a long time, etc.) or it may be determined to be important based on the amount of time the client device has been attempting to transmit it.

At 706, the client device may establish, via the wireless interface, a connection with the proxy device for communicating the data with the WAN or Internet when the suitability metric is greater than the suitability threshold. In some examples, the threshold may be type and/or time dependent. In other words, the threshold might change as the time since the last upload has passed, such that the longer the client device is disconnected from the WAN, the lower the threshold may become in order to facilitate a connection with the WAN, even when the suitability metric is not ideal. The threshold might also be type dependent (such as upload type or the like). For example, if the client device has a message to send, the client device may lower the threshold or accept a lower suitability metric (e.g, even lower than the threshold) in order to connect to the WAN to upload the message. Some data, with higher or lower priority, may affect the threshold in different ways as well.

In some embodiments, the data included in the connection request may be the suitability metric itself or it may include the suitability metric. Alternatively, the client device may determine the suitability metric based on (e.g., utilizing) the data included in the connection request. The suitability threshold may be based on the time since the last connection to the network, and the suitability metric may decrease as the time since the last connection to the network increases. The suitability threshold may also be based on the importance of the information, and the suitability threshold may decrease as the importance of the information increases. Further, the importance of the information may be configured by the user of the client device and/or determined based on the content of the information (e.g., a message labeled as urgent, a message with a time-stamp that is getting old, a message to a user in a priority list, information flagged as important, etc.).

According to one embodiment, radio devices of the client device may be configured to report link metrics such as, but not limited to, RSSI metrics, speed metrics of the host device, direction metrics of the host device, signal-to-noise ratio metrics, and/or congestion control algorithm metrics. In some examples, the suitability metric may be based on one or more of the link metrics. The RSSI metrics may be included in the connection request from the host device, and the host device may be capable of increasing the suitability metric as the received signal strength indication metrics increase. The host device may also be capable of increasing the suitability metric as the speed metrics of the host device and/or the direction metrics of the host device become more similar to a speed and a direction of the client device (e.g., the speed and direction of the two devices become more aligned, making them potentially more compatible for communication). Similarity of speed and direction may be based on predefined or dynamic threshold. The signal-to-noise ratio metrics may define an amount of signal strength associated with the communication with the host device with respect to noise detected during the communication with the host device, and the host device may be capable of increasing the suitability metric as the signal-to-noise ratio metrics increase. Further, the congestion control algorithm metrics may define a calculated amount of congestion associated with the communication between the client device and the host device, and the host device may also be capable of increasing the suitability metric as the congestion control algorithm metrics increase.

D. Additional Embodiments

Figure 8:
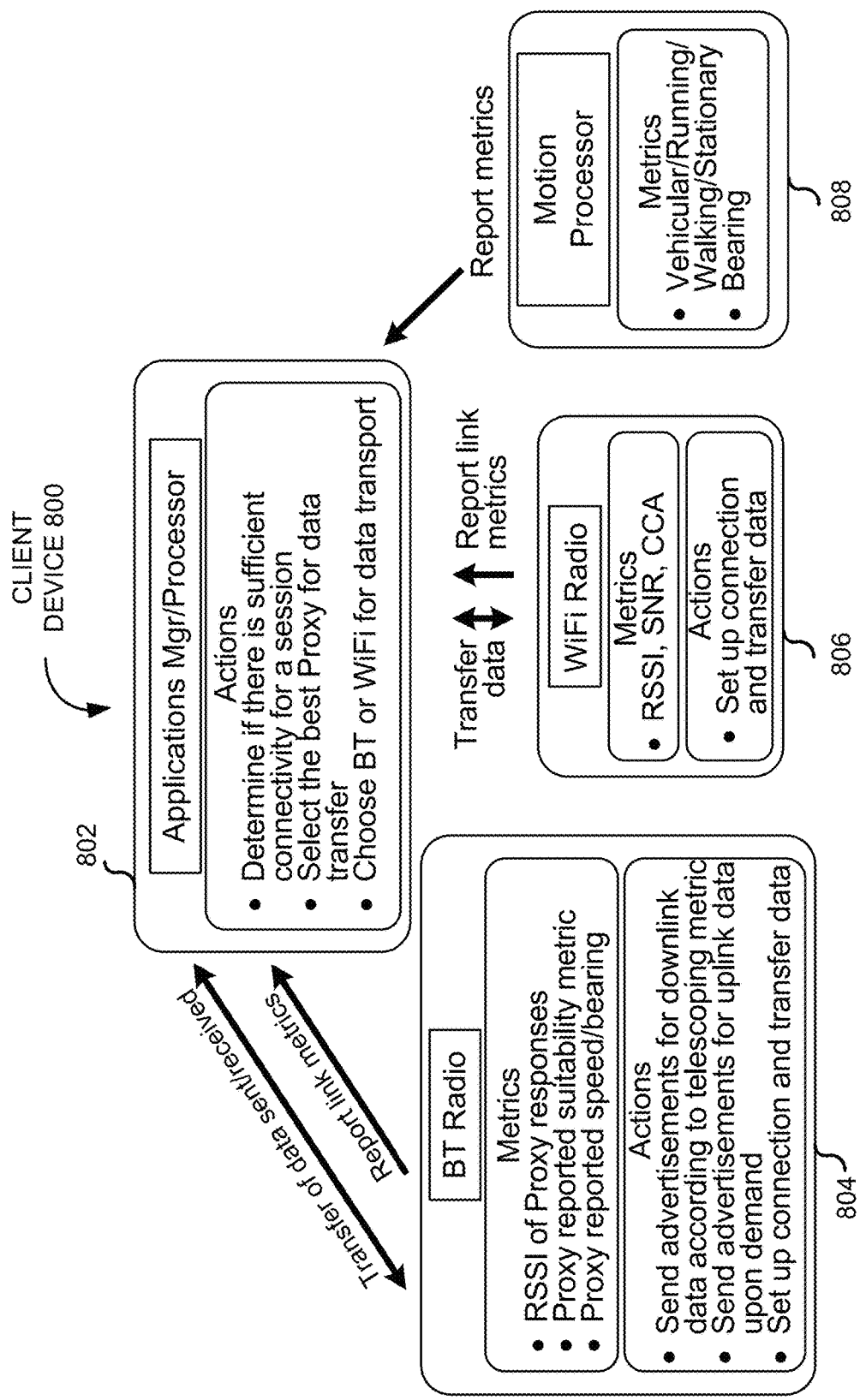
FIG. 8 is an example block diagram showing additional features of a client device.

FIG. 8 is a block diagram illustrating example embodiments of a client device 800 capable of performing at least some of the features described at least with reference to the client devices of FIGS. 1-7. For example, the client device 800 may be configured to perform operations and/or embodiments described above with respect to method 400 and/or method 700 of FIGS. 4 and 7, respectively. In some embodiments, the client device 800 may be configured with an applications manager and/or applications processor 802. Processor 802 may be responsible for determining whether there is sufficient connectivity for a session (e.g., whether the client device 800 will likely be able to connect to a proxy device). Processor 802 may also select the best proxy device for data transfer when there are multiple proxy offers or connection requests received by the client device. Processor 902 may also determine which radio access technology (RAT) to use for the data transport when a connection is established with a proxy device (e.g., whether to use BT (classic and/or low-energy) or WiFi for the data transport). The BT or WiFi will be used to communicate with the proxy device.

Client device 800 may also be equipped with a BT radio 804 and a WiFi radio 806, as well as a motion processor 808. BT radio 804 may track RSSI metrics associated with proxy responses, suitability metrics reported by the proxy device, and/or speed and bearing information reported by the proxy device. These metrics may be reported to the processor 802. BT radio 804 may also send advertisements for downlink data according to a telescoping metric (e.g., to the proxy device), send advertisements for uplink data upon demand (e.g., to the proxy device), and/or set up connections for the transfer of data between the client device 800 and the proxy device. WiFi radio 806 may also track and report (e.g., to the processor 802) RSSI metrics, and may also track and report SNR and/or CCA metrics. WiFi radio 806 may also be configured to set up a connection between the client device 800 and the proxy device and/or transfer data between the two. Motion processor 808 may be configured to identify, detect, or otherwise calculate vehicular, running, walking, stationary, etc., metrics as well as bearing/direction metrics of the client device 800.

Figure 9:
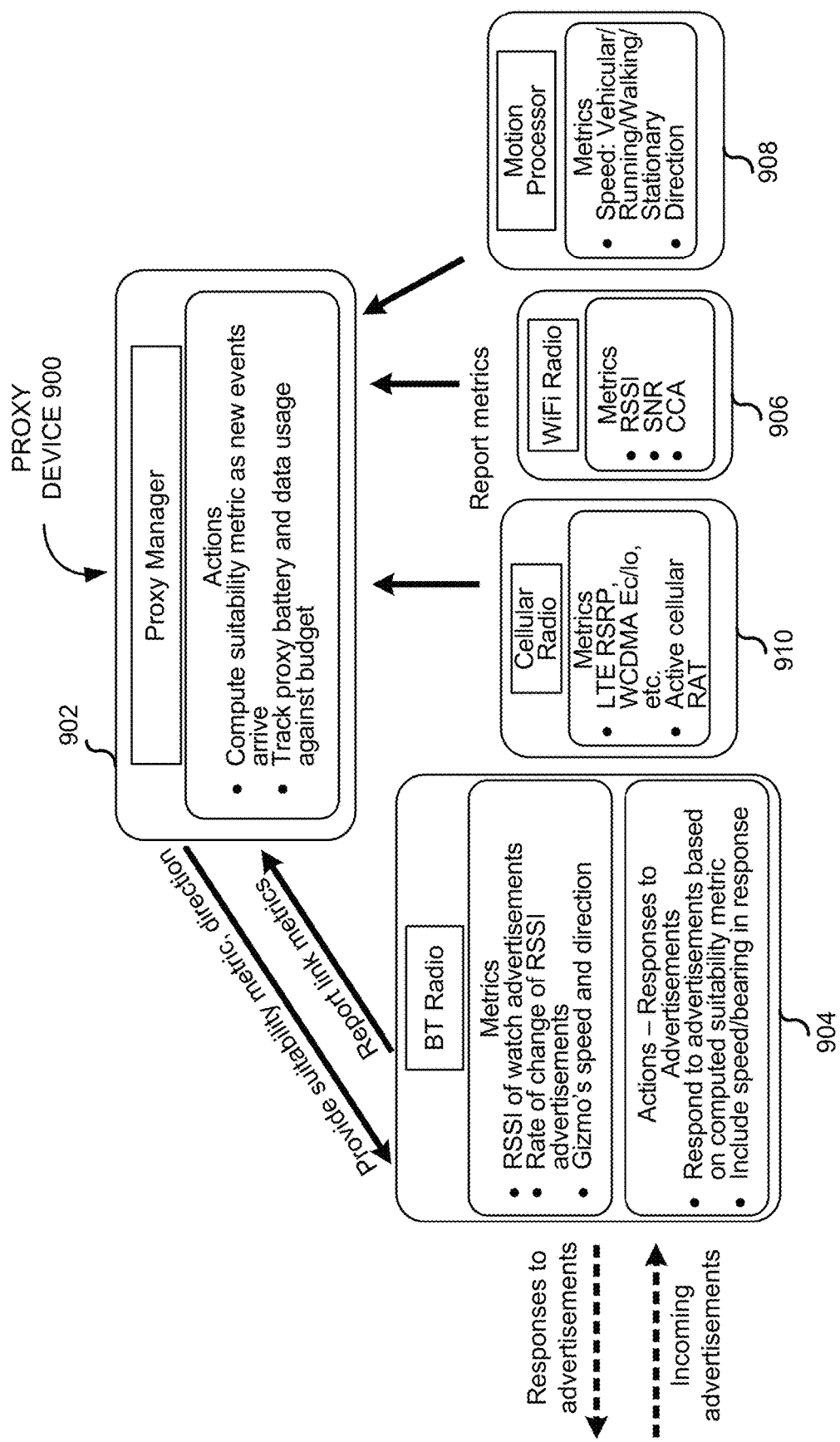
FIG. 9 is an example block diagram showing additional features of a proxy device.

FIG. 9 is a block diagram illustrating example embodiments of a proxy device 900 capable of performing at least some of the features described at least with reference to the proxy devices of FIGS. 1-7. In some embodiments, the proxy device 900 may be configured with a proxy manager 902. Proxy manager 902 may be responsible for computing a suitability metric (e.g., as new events arrive) and/or track proxy battery and data usage against the budget (e.g., based on an account with a service provider or the like). Proxy manager 902 may also be responsible for selecting an appropriate RAT. In some embodiments, a response to an advertisement from a client device (e.g., the client device 800 of FIG. 8 or any of the client devices described with respect to FIGS. 1-7) may be an offer to serve as a proxy (e.g., a proxy offer). As noted, the suitability metric may be used by the proxy manager 902 to determine whether to volunteer to serve as a proxy. In some embodiments, an initial communication between the client device and the proxy device 900 may be via BTLE or the like; however, the proxy manager 902 may determine to switch RATs and utilize a different technology (or radio) for future communications. In other words, a BT radio 904 may receive incoming advertisements from client devices, but the proxy device 900 may respond with a proxy offer using a WiFi radio 906. The proxy connection may then utilize the WiFi radio 906 even though the initial communication was via BTLE. The opposite scenario, or alternative scenarios, may also be implemented as desired.

As noted, proxy device 900 may be equipped with both a BT radio 904 and a WiFi radio 906, as well as a motion processor 908 and a cellular radio 910. In some embodiments, the radios may report changes in metrics as events to the proxy manager 902. BT radio 904 may track RSSI metrics associated with advertisements from a client device, rate of change of RSSI advertisements, and/or the speed and bearing of the client device. These metrics may be reported to the proxy manager 902. BT radio 904 may also respond to advertisements based on the suitability metric and/or include the speed and bearing of the proxy device 900 in responses (e.g., proxy offers). WiFi radio 906 may also track and report (e.g., to the proxy manager 902) RSSI metrics, and may also track and report SNR and/or CCA metrics. Motion processor 908 may be configured to identify, detect, or otherwise calculate vehicular, running, walking, stationary, etc., metrics as well as bearing/direction metrics of the proxy device 900. Further, cellular radio 910 may track LTE, RSRP, WCDMA, etc. metrics as well as active cellular RAT metrics (e.g., for determining which cellular technology to use when multiple technologies are available).

V. Devices

Figure 10:
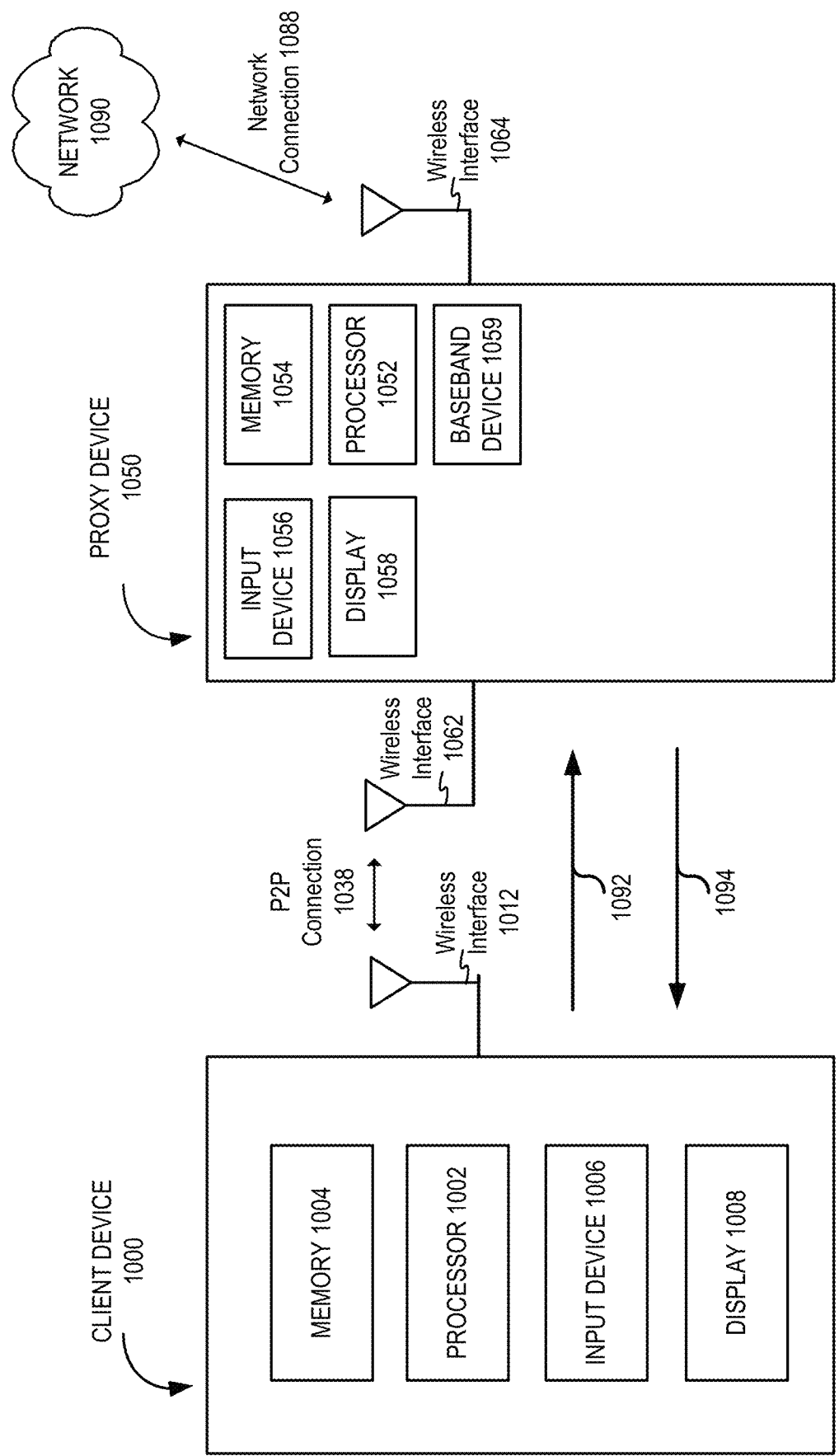
FIG. 10 is an example block diagram showing additional embodiments of a client device and a proxy device.

FIG. 10 illustrates additional examples of client devices and proxy (host) devices that may be used in conjunction with or as part of systems 100, 300, or 500 of FIGS. 1, 3, and 5, respectively, to implement the management of proxy connections. While two embodiments are illustrated by these figures, various implementations may include any number of client devices, host devices, and different networks, which may be supported by the devices in a particular setup.

It should be apparent that the systems shown in FIG. 10 illustrate several example embodiments, but that other similar embodiments can have more or fewer components than what is shown. Other embodiments may also include different configurations of the illustrated components, while remaining within the scope of the innovations herein.

FIG. 10 illustrates an embodiment with client device 1000, proxy (host) device 1050, and network 1090. Client device 1000 may be any device accessible by a wireless interface, including a desktop computer, a laptop computer, a smartphone, a tablet computer, a wearable device (e.g. a network enabled watch, earpiece, or necklace,) a networked appliance (e.g. a network enabled refrigerator or clothes washer,) media player, personal digital assistant, key fob, access card, multi-function device, game system, or any other such client device.

In some embodiments, once a client device 1000 or a proxy device 1050 decides to establish a proxy connection, the two devices attempt to upload and/or download the appropriate data as quickly and efficiently as possible. This is because there is a chance the connection will terminate (end or be interrupted), sometimes before the transmission is complete, since the two devices may be moving and may not be moving together. For example, it may be possible for a user with a client device 1000 to be walking past a user with a proxy device 1050 and have the client device 1000 access the Internet through the proxy device 1050. If the users are walking slowly (e.g., in a crowded area, while waiting for public transit, at a park, or while one or both are waiting on a traffic light or crosswalk), the two devices may establish a connection and transmit data while the two users are in effective communication range of one another. In some embodiments, non-standard transfer protocols may be utilized by the two devices to enable a faster connection and data transfer.

In some embodiments, when the client device 1000 and/or proxy device 1050 calculate and/or provide their respective speeds, they may provide a classification or category of speed (e.g., slow, medium, fast, etc.) as opposed to a raw speed (e.g., feet per second or the like). As such, matching a speed and bearing may include relative matches, such that the two devices match within a category and don't necessarily have to match exactly.

Additionally, in some embodiments, a proxy device 1050 may receive multiple connection advertisements (also referred to as "advertisement messages" or "connection requests") from multiple client devices. However, the proxy device 1050 may simply respond to the first advertisement that it receives, either not aware that it will receive other advertisements or simply as an efficiency (e.g., it could be configured to always respond to the next advertisement received). In some cases, the proxy device 1050 may also track changes between advertisements. For example, based on a device ID or the like, the proxy device 1050 may be able to differentiate between advertisements from different client devices, identifying overall changes within the set of advertisements (e.g., from all client devices) and/or identifying changes within the advertisements from each particular client device 1000. As such, the proxy device 1050 may track that the RSSI or other information in the advertisement that indicates that the suitability of connecting with a particular client device 1000 may be improving. In some instances, even if the factors are not ideal (or are below the thresholds for providing a proxy offer), the proxy device 1050 may provide a proxy offer since it can infer that the conditions are improving and will eventually be good enough to offer a solid proxy connection. In some examples, the proxy device 1050 may behave as a router.

Client device 1000 may be any device accessible by a wireless interface, including a desktop computer, a laptop computer, a smartphone, a tablet computer, a wearable device (e.g. a network enabled watch, earpiece, or necklace,) a networked appliance (e.g. a network enabled refrigerator or clothes washer,) media player, personal digital assistant, key fob, access card, multi-function device, game system, or any other such client device. Client device 1000 comprises memory 1004, processor 1002, input device 1006, display 1008, and wireless interface 1012. Host device 1050 includes processor 1052, memory 1054, input device 1056, display 1058, wireless interface 1062, wireless interface 1064, and baseband device 1059.

Host device 1050 may be any communication device capable of providing data sharing to a client device 1000 in a fashion similar to what is described above for data sharing from various host devices to various client devices. Certain embodiments of host devices may have multiple communications interfaces, such that as part of data sharing performed by a host device, the host device communicates with a network using one communication interface based on a first communication protocol, and a the host device communicates with a client device using a second communication interface different from the first communication interface and based on a second communication protocol different from the first communication protocol. Examples of such host devices may include smart phones, desktop computers, laptop computers, and other such network enabled computing devices.

Client device 1000 may communicate with host device 1050 via connection 1038 (also referred to as the second network, where the first network is network connection 1088). Similarly, host device 1050 may communicate with network 1090 via connection 1088. In further embodiments, client device 1000 may also create a connection with one or more other networks including network 1090 (e.g., via a separate wireless interface and/or via the proxy connection 1038). In some examples, the connection 1038 (or at least the two wireless interfaces 1012, 1062) may be utilized for providing or otherwise communicating the advertisement message 1092 (e.g., from the client device 1000 to the proxy device 1050) and/or the proxy offer 1094 (e.g., from the proxy device 1050 to the client device 1000).

Different embodiments may implement connection 1038, connection 1088, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A host or client device can include wireless circuitry as part of wireless interfaces, such as wireless interface 1012, wireless interface 1062, and wireless interface 1064, that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Connection 1038 in particular may, in certain embodiments, be implemented as a peer to peer (P2P) wireless connection directly between wireless interface 1012 and wireless interface 1062. In other embodiments, connection 1038 may include multiple additional devices and sub-connections, including multiple access points, network routing connections, and communication servers.

Wireless circuitry may be used in conjunction with wireless interfaces such as wireless interfaces 1012, 1062, and 1064 to send and receive information over wireless connections such as connection. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Wireless circuitry may be coupled to processors such as processor 1002 and processor 1052 via peripherals interfaces. Voice and data information received by wireless circuitry may be sent to one or more processors via peripheral interfaces. One or more processors such as processors 1002 and 1052 may be configurable to process various data formats for one or more application programs stored on the memory of a device.

Processors 1002 and 1052 may run various software components stored in respective memories 1004 and 1054 to perform various functions for devices 1000 and 1050. In some embodiments, the software components include an operating system, a communication module (or set of instructions), and other applications (or sets of instructions). In different embodiments, a processor may be a single integrated circuit, a set of multiple integrated circuits, or any logic hardware that may be used to implement processing functionality.

An operating system executed by a processor can be any suitable operating system. The operating system can include various procedures, sets of instructions, software components, and/or drivers for controlling and managing general system tasks (e.g., memory management, storage device control, power management, etc.) and facilitates communication between various hardware and software components.

Memory as described herein, including memory 1004 and memory 1054, may be any computer-readable medium and may further be any device or medium that can store code and/or data for use by one or more processors or device components. This may include a memory hierarchy, including cache, main memory, and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interfaces, one or more processors, and a memory controller can be implemented on a single chip within any device described herein. In some other embodiments, they can be implemented on separate chips.

Any device described herein such as host device 1050 and client device 1000 may also include power systems for powering the various hardware components. Power systems can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, host devices and/or client devices may include various sensors. A camera may be one example of a sensor. Such camera devices along with other sensors may be considered input devices as part of input device 1056. A camera may be used to create AV data for video calls or for pictures that may be communicated via data sharing provided by a host device. In some embodiments, devices may also include various other sensors. Sensors can include accelerometers, compass, gyrometer, pressure sensors, audio sensors, light sensors, barometers, microphones, and the like. Sensors can be used to implement various device decision making and filtering, such as blur compensation for a video image in a video call, or audio filtering to assist in filtering background noise from audio information captured at one or more microphones.

In some embodiments, a client device 1000 or a proxy device 1050 can include a Global Positioning System (GPS) receiver or other location assistance devices or modules. A device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. Other non-GPS location/motion modules may assist in determining the current position (e.g., coordinates or other geographic location identifier) and motion of a client device 1000 or host device 1050. In addition to GPS, cellular network positioning based on "cell IDs," and WiFi positioning technology based on a WiFi networks may be used for location assistance. In some embodiments, location/motion modules may use sensor information with the above systems to determine the current position of the host device. The location information may then be used to manage data sharing connections not only for a current host device that is sharing data, but for other host devices that may be used for data sharing based on movement of client devices.

Processor 1002 and processor 1052 may execute one or more applications on their respective devices, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications can also include a specific application for managing data sharing communications.

There may be other modules or sets of instructions such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem including various input devices can be coupled to a display system such as display 1008 or display 1058. These displays may be touch-sensitive and may therefore operate as displays and input devices. A touch sensitive display of client device 1000 may thus operate both as input device 1006 and display 1008. A touch sensitive display of host 1050 may operate as display 1058 and input device 1056. The display may present visual output to the user as a graphic user interface (UI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, an I/O subsystem can include a display and user input devices such as a keyboard, mouse, and/or trackpad as part of input device(s) 1006 or input device(s) 1056. In some embodiments, I/O subsystem can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the input devices of a particular client device or host device can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, devices may include a touchpad separate from the screen for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

In addition to client devices such as client devices 1000 and host devices such as host device 1050 detailed above, aspects of networks such as network 1090 and network connections such as network connection 1038 may also be implemented using various devices and device components. For example, while in certain embodiments connection 1038 may simply be a P2P wireless connection directly between wireless interface 1012 and wireless interface 1062, in other embodiments, a communications network may be used to implement connection 1038. Such a connection may include one or more access points, routers, server computers, storage devices, or other devices to implement network connection 1038. Each of these devices may include a processor, memory, and input/output structure as detailed above. Similarly, other network connections may involve cell towers, switching networks, packet processing devices, in addition to the server computers and other network infrastructure detailed above, each of which may include processing, memory, and network interface components.

In some embodiments, methods, systems, devices, and computer-readable media may be configured to receive (by a client device comprising a wireless interface for communicating with the host device, a memory, a motion detection sensor, and a processor coupled to the memory, to the motion detection sensor, and to the wireless interface) a trigger signal indicating that an attempt to communicate data with a network is to be performed; in response to the trigger signal, identify, via the motion detection sensor, a speed and a direction of motion associated with the client device; generate an advertisement message for connecting to the host device; and providing, via the wireless interface, the advertisement message to the host device for requesting a wireless connection to the host device. In some embodiments, the advertising message may include the speed and the direction, and a request for the data to be communicated with the network. In some embodiments, a connection signal may be received from the host device that indicates an offer for the client device to connect to the host device.

In some embodiments, the connection signal may comprise a second speed and a second direction corresponding to the host device. In some embodiments, a connection may be established with the host device based on the second speed and the second direction. In some embodiments, the client device may be associated with a first user and the host device may be associated with a second user, and the first user may be different from the second user. In some embodiments, it may be determined whether the first user is different from the second user at least in response to the trigger signal. In some embodiments, the request for the wireless connection to the host device may be canceled when the first user is not different from the second user. In some embodiments, the trigger signal may be received periodically based on an amount of time since a last connection with the network or the trigger signal may be an indication of a selection to communicate the data with the network. In some embodiments, the wireless interface may comprise a Bluetooth radio and/or a WiFi radio.

In some embodiments, methods, systems, devices, and computer-readable media may be configured to receive (by a client device comprising a wireless interface for communicating with the host device, a memory, a motion detection sensor, and a processor coupled to the memory, to the motion detection sensor, and to the wireless interface), via the wireless interface, a connection request from the host device, where the connection request includes data for obtaining a suitablity metric associated with the host device; compare the suitability metric to a suitability threshold associated with the client device; and establish, via the wireless interface, a connection with the host device for communicating the data with the network when the suitability metric is greater than the suitability threshold. The suitability threshold may be based on a time since a last connection to the network and/or an importance of information to be communicated with the network.

In some embodiments, the data included in the connection request may comprise the suitablity metric. In some embodiments, the suitability metric may be determined based on the data included in the connection request. In some embodiments, the suitability threshold may be based on the time since the last connection to the network, and the suitability threshold may decrease as the time since the last connection to the network increases. In some embodiments, the suitability threshold may be based on the importance of the information, and the suitability threshold may decrease as the importance of the information increases. In some embodiments, the importance of the information may be configured by a user of the client device and/or determined based on content of the information. In some embodiments, the client device may also comprises a motion detection sensor for detecting a speed and a direction of motion of the client device prior to receipt of the connection request. In some embodiments, the speed and the direction of motion of the client device may be provided to the host device for use in calculating the suitability metric. In some embodiments, the client device may be associated with a first user and the host device may be associated with a second user different from the first user.

In some embodiments, the wireless interface may comprise a Bluetooth radio and/or a WiFi radio. In some embodiments, the Bluetooth radio and/or the WiFi radio may be configured to report link metrics comprising received signal strength indication metrics associated with the communication with the host device, speed metrics of the host device, direction metrics of the host device, signal-to-noise ratio metrics associated with the communication with the host device, and/or congestion control algorithm metrics associated with the communication with the host device. In some embodiments, the suitability metric may be based on at least one of the link metrics. In some embodiments, the received signal strength indication metrics may be included in the connection request from the host device, and the host device may be capable of increasing the suitability metric as the received signal strength indication metrics increase. In some embodiments, the host device may be capable of increasing the suitability metric as the speed metrics of the host device and the direction metrics of the host device become more similar to a speed and a direction of the client device. In some embodiments, the signal-to-noise ratio metrics may define an amount of signal strength associated with the communication with the host device with respect to noise detected during the communication with the host device, and the host device may be capable of increasing the suitability metric as the signal-to-noise ratio metrics increase. In some embodiments, the congestion control algorithm metrics may define a calculated amount of congestion associated with the communication with the host device, and the host device may be capable of increasing the suitability metric as the congestion control algorithm metrics increase.

In some embodiments, methods, systems, devices, and computer-readable media may be configured to receive (by a host device comprising a wireless interface, a memory, and a processor coupled to the memory and to the wireless interface), via the wireless interface, an advertisement message from the client device, the advertisement message including a request for communication of data with the network; in response to receiving the advertisement message, determine a suitability metric indicating an ability for the host device to communicate the data with the network and communicate the data with the client device at a time of receiving the advertisement message; compare the suitability metric to a threshold; and determine, based on the comparison, whether to provide a connection request to the client device. In some embodiments, the suitability metric may be determined based on one or more properties of the client device as determined from the advertisement message and/or one or more connection properties of the host device with the network. In some embodiments, the connection request may be provided to the client device when the suitability metric exceeds the threshold. In some embodiments, the connection between the client device and the network may be enabled at least in response to an indication that the client device accepts the connection request. In some embodiments, it may be determined to provide the connection request to the client device when the suitability metric is greater than the threshold. In some embodiments, the connection request may not be provided to the client device when the suitability metric is less than the threshold.

In some embodiments, the host device may also comprises a motion detection sensor for detecting a speed and a direction of motion of the host device prior to receipt of the advertisement message, and the suitability metric may be further based on at least one of the speed and/or the direction of the motion of the host device. In some embodiments, the client device may be associated with a first user and the host device may be associated with a second user, and the first user may be different from the second user. In some embodiments, it may be determined not to provide the connection request to the client device when a first user associated with the client device is not different from a second user associated with the host device. In some embodiments, the one or more properties of the client device may comprise at least one of a speed of the client device and/or a direction of the client device. In some embodiments, the one or more connection properties of the host device may comprise received signal strength indication metrics associated with the receipt of the advertisement message, signal-to-noise ratio metrics associated with the receipt of the advertisement message, and/or congestion control algorithm metrics associated with the receipt of the advertisement message.

In some embodiments, the threshold may based on an importance or priority of the data of the client device. In some embodiments, the importance or priority of the data of the client device may be received in the advertisement message. In some embodiments, the one or more connection properties of the host device may comprise a change in a received signal strength indicator metric from a first advertisement to second advertisement received from the client device. In some embodiments, the host device may also comprise a second network interface for connecting to the network, and the second network interface may comprise a cellular radio. In some embodiments, the one or more properties of the client device may comprise a speed of the client device and/or a direction of motion of the client device. In some embodiments, the suitability metric may be determined to be higher than an initial amount when the speed of the client device and the direction of motion of the client device are similar to a second speed and a second direction of motion, where the second speed and the second direction of motion correspond to the host device. In some embodiments, the one or more connection properties of the host device may comprise a signal strength with the network and/or a congestion of the network. In some embodiments, the suitablity metric may be determined to be higher than an initial amount when the signal strength with the network is above a signal strength threshold and/or the congestion of the network is below a congestion threshold.

Although the disclosure has been described with respect to specific embodiments, it will be appreciated that the disclosure is intended to cover all modifications and equivalents within the scope of the following claims.

Figure 11:
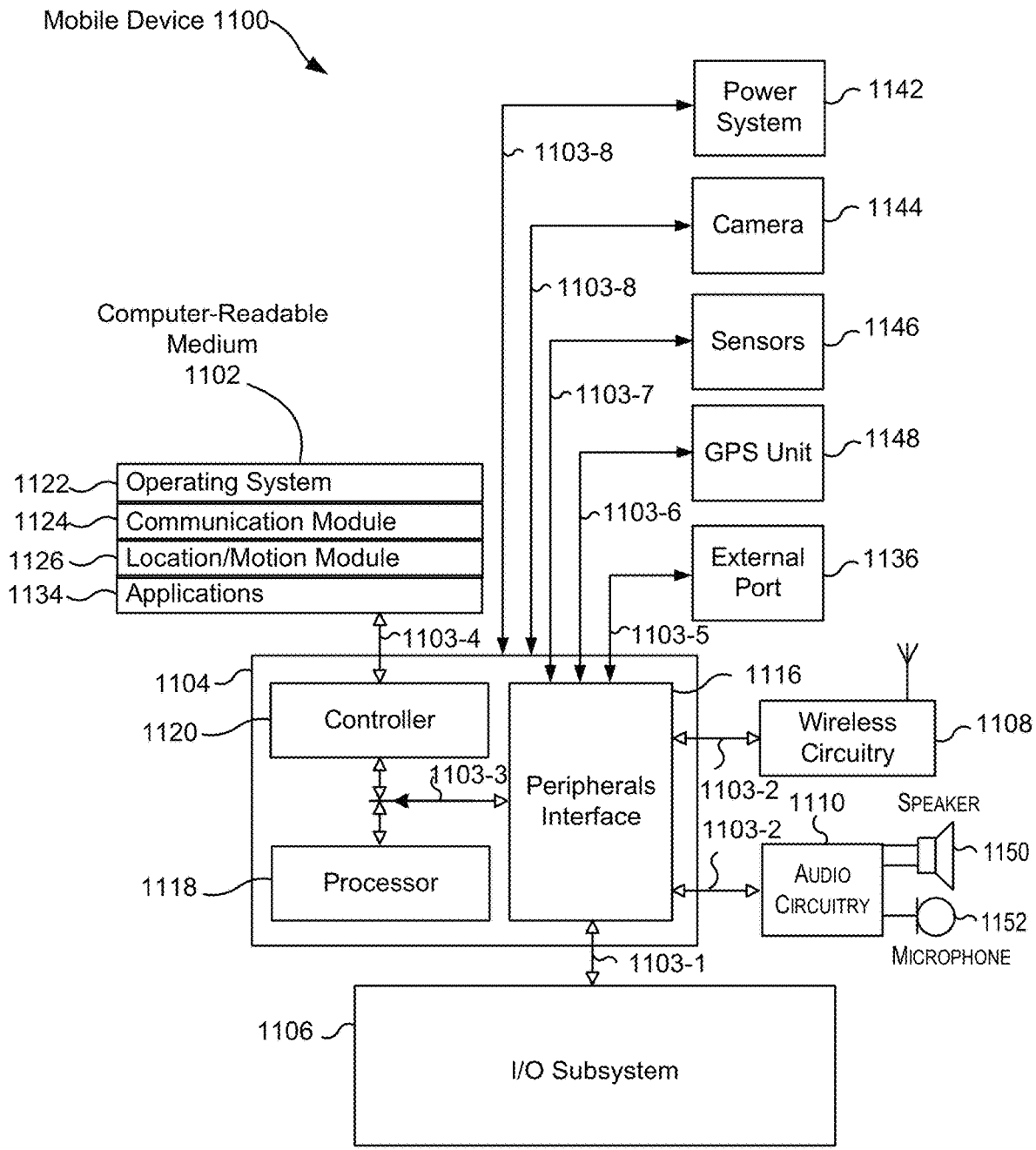
FIG. 11 is an example block diagram showing a device that may be a host device, a client device, or a server.

FIG. 11 is an example block diagram showing a device that may be a host device, a client device, or a server. Mobile device 1100 generally includes computer-readable medium 1102, a processing system 1104, an Input/Output (I/O) subsystem 1106, wireless circuitry 1108, and audio circuitry 1110 including speaker 1150 and microphone 1152. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. In various embodiments, first device 600 or second device 650 or any other device, server, access point, network element or other computing device or element may be implemented in whole or in part using the elements of FIG. 11.

It should be apparent that the architecture shown in FIG. 11 is only one example of an architecture for mobile device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1108 is capable of establishing and maintaining communications with other devices using one or more communication protocols. A mobile device can include wireless circuitry that can communicate over several different types of wireless networks depending on the range required for the communication.

Wireless circuitry 1108 is coupled to processing system 1104 via peripherals interface 1116. Interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on medium 1102.

Peripherals interface 1116 couple the input and output peripherals of the device to processor 1118 and computer-readable medium 1102. One or more processors 1118 communicate with computer-readable medium 1102 via a controller 1120. Computer-readable medium 1102 can be any device or medium that can store code and/or data for use by one or more processors 1118. Medium 1102 can include a memory hierarchy, including cache, main memory, and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1116, one or more processors 1118, and memory controller 1120 can be implemented on a single chip, such as processing system 1104. In some other embodiments, they can be implemented on separate chips.

Mobile device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1100 includes a camera 1144. In some embodiments, mobile device 1100 includes sensors 1146. Sensors can include accelerometers, compasses, gyrometers, pressure sensors, audio sensors, light sensors, barometers, and the like. Sensors 1146 can be used to sense location aspects, such as auditory or light signatures of a location.

In some embodiments, mobile device 1100 can include a Global Positioning System (GPS) receiver, sometimes referred to as a GPS unit 1148. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in medium 1102 to perform various functions for device 1100. In some embodiments, the software components include an operating system 1122, a communication module (or set of instructions) 1124, a location/motion module (or set of instructions) 1126, and other applications (or set of instructions) 1134, such as a car locator app and a navigation app. In some examples, the other applications 1134 may include applications that enable the functionality described above, namely the management of proxy connections implemented by speed detection module 5011, bearing detection module 510, advertisement module 511, speed/bearing module 560, and/or proxy offer module 561 of FIG. 5.

Operating system 1122 can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., USB, FireWire, Lightning connector, 60-pin connector, etc.) is adapted for coupling directly to other devices or indirectly over a network (e.g., the Internet, wireless LAN, etc.).

Location/motion module 1126 can assist in determining the current position (e.g., coordinates or other geographic location identifier) and motion (e.g., speed and bearing information described above) of mobile device 1100. Modern positioning systems include satellite based positioning systems, such as GPS, cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position, speed, and/or bearing of the mobile device. In some embodiments, location/motion module 1126 can determine a current location, speed, and/or bearing using WiFi or cellular location technology. For example, the location, speed, and/or bearing of the mobile device can be estimated using knowledge of nearby cell sites and/or WiFi access points with knowledge also of their locations. Information identifying the WiFi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 1100 based at least in part on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data.

The one or more applications 1134 on the mobile device can include any applications installed on the device 1100, including without limitation, a browser, address book, contact list, email, instant messaging, word processing, keyboard emulation, data routing, proxy connection managers, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

The I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present disclosure may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the disclosure has been described with respect to specific embodiments, it will be appreciated that the disclosure is intended to cover all modifications and equivalents within the scope of the following claims.

What is claimed is:

1. A method, comprising:
    identifying, by a wearable device, data to be communicated with a network;
    determining one or more motion properties of the wearable device;
    providing, by the wearable device, the one or more motion properties and a request for a connection to a mobile device that is connected to the network;
    receiving, by the wearable device, a connection request from the mobile device that is connected to the network, the connection request comprising a metric indicating a level of a connection of the mobile device with the network, the metric being based at least in part on the one or more motion properties;
    determining whether the mobile device is capable of transmitting the data to the network based at least in part on the metric indicating the level of the connection of the mobile device with the network; and
    establishing, by the wearable device, a connection with the mobile device in accordance with determining that the mobile device is capable of transmitting the data to the network.

2. The method of claim 1, wherein determining whether the mobile device is capable of transmitting the data to the network is based at least in part on determining that the one or more motion properties of the wearable device compare in a predetermined manner to the metric indicating the level of the connection of the mobile device.

3. The method of claim 1, further comprising receiving an additional connection request from an other mobile device, the additional connection request comprising a second metric indicating a level of a second connection of the other mobile device.

4. The method of claim 3, wherein determining whether the mobile device is capable of transmitting the data to the network further comprises determining whether the other mobile device is capable of transmitting the data to the network based at least in part on the second metric.

5. The method of claim 4, further comprising selecting the mobile device for establishing the connection with the wearable device from a plurality of devices comprising the mobile device and the other mobile device.

6. The method of claim 1, wherein the one or more motion properties comprise at least one of a speed or a direction of the wearable device, and wherein the metric indicating the level of the connection of the mobile device comprises at least one of: a speed of the mobile device, a direction of the mobile device, a signal strength indication metric associated with the connection of the mobile device, a signal-to-noise ratio metric associated with the connection of the mobile device, or a congestion control algorithm metric associated with the connection of the mobile device.

7. The method of claim 1, further comprising transmitting the data to the mobile device using the established connection.

8. The method of claim 1, further comprising determining, by the wearable device, whether the wearable device is within range of an other device capable of acting as a host device.

9. The method of claim 8, further comprising broadcasting an advertisement for the other device to communicate the data to the network.

10. The method of claim 9, further comprising receiving an other connection request in response to the advertisement.

11. A wearable device, comprising:
    a wireless interface for communicating with a mobile device;
    a memory; and
    a processor coupled to the memory and to the wireless interface, the processor configured to execute instructions to:
        identify data to be communicated with a network;
        determine one or more motion properties of the wearable device;
        provide the one or more motion properties and a request for a connection to a mobile device that is connected to the network;
        receive a connection request from the mobile device that is connected to the network, the connection request comprising a metric indicating a level of a connection of the mobile device with the network, the metric being based at least in part on the one or more motion properties;
        determine whether the mobile device is capable of transmitting the data to the network based at least in part on the metric indicating the level of the connection of the mobile device with the network; and
        establish a connection with the mobile device in accordance with determining that the mobile device is capable of transmitting the data to the network.

12. The wearable device of claim 11, wherein determining whether the mobile device is capable of transmitting the data to the network is based at least in part on determining that the one or more motion properties of the wearable device compare in a predetermined manner to the metric indicating the level of the connection of the mobile device.

13. The wearable device of claim 11, wherein the processor is further configured to execute the instructions to receive an additional connection request from an other mobile device, the additional connection request comprising a second metric indicating a level of a second connection of the other mobile device, and wherein determining whether the mobile device is capable of transmitting the data to the network further comprises determining whether the other mobile device is capable of transmitting the data to the network based at least in part on the second metric.

14. The wearable device of claim 13, wherein the processor is further configured to execute the instructions to select the mobile device for establishing the connection with the wearable device from a plurality of devices comprising the mobile device and the other mobile device.

15. The wearable device of claim 11, wherein the one or more motion properties comprise at least one of a speed or a direction of the wearable device, and wherein the metric indicating the level of the connection of the mobile device comprises at least one of: a speed of the mobile device, a direction of the mobile device, a signal strength indication metric associated with the connection of the mobile device, a signal-to-noise ratio metric associated with the connection of the mobile device, or a congestion control algorithm metric associated with the connection of the mobile device.

16. A non-transitory computer-readable storage medium storing computer-executable instructions that, when executed by a wearable device, configure the wearable device to perform operations comprising:
    identifying data to be communicated with a network;
    determining one or more motion properties of the wearable device;
    providing, by the wearable device, the one or more motion properties and a request for a connection to a mobile device that is connected to the network;
    receiving a connection request from the mobile device that is connected to the network, the connection request comprising a metric indicating a level of a connection of the mobile device with the network, the metric being based at least in part on the one or more motion properties;
    determining whether the mobile device is capable of transmitting the data to the network based at least in part on the the metric indicating the level of the connection of the mobile device with the network; and
    establishing a connection with the mobile device in accordance with determining that the mobile device is capable of transmitting the data to the network.

17. The non-transitory computer-readable storage medium of claim 16, wherein determining whether the mobile device is capable of transmitting the data to the network is based at least in part on determining that the one or more motion properties of the wearable device compare in a predetermined manner to the metric indicating the level of the connection of the mobile device.

18. The non-transitory computer-readable storage medium of claim 16, wherein the operations further comprise receiving an additional connection request from an other mobile device, the additional connection request comprising a second metric indicating a level of a second connection of the other mobile device, and wherein determining whether the mobile device is capable of transmitting the data to the network further comprises determining whether the other mobile device is capable of transmitting the data to the network based at least in part on the second metric.

19. The non-transitory computer-readable storage medium of claim 18, wherein the operations further comprise selecting the mobile device for establishing the connection with the wearable device from a plurality of devices comprising the mobile device and the other mobile device.

20. The non-transitory computer-readable storage medium of claim 16, wherein the one or more motion properties comprise at least one of a speed or a direction of the wearable device, and wherein the metric indicating the level of the connection of the mobile device comprises at least one of: a speed of the mobile device, a direction of the mobile device, a signal strength indication metric associated with the connection of the mobile device, a signal-to-noise ratio metric associated with the connection of the mobile device, or a congestion control algorithm metric associated with the connection of the mobile device.

* * * * *

UNITED STATES PATENT AND TRADEMARK OFFICE
CERTIFICATE OF CORRECTION

PATENT NO. : 11,026,283 B2  
APPLICATION NO. : 16/122131  
DATED : June 1, 2021  
INVENTOR(S) : Ajoy K. Singh et al.

Page 1 of 1

It is certified that error appears in the above-identified patent and that said Letters Patent is hereby corrected as shown below:

In the Claims

Column 16, Claim 16, Line 27, delete "on the the metric indicating" and insert --on the metric indicating--

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*